(12) United States Patent
Merrill et al.

(10) Patent No.: US 7,651,715 B2
(45) Date of Patent: *Jan. 26, 2010

(54) BLENDED CHEESES AND METHODS FOR MAKING SUCH CHEESES

(75) Inventors: Richard K. Merrill, Highlands Ranch, CO (US); Mayank Singh, Aurora, CO (US)

(73) Assignee: Leprino Foods Company, Denver, CO (US)

( * ) Notice: Subject to any disclaimer, the term of this patent is extended or adjusted under 35 U.S.C. 154(b) by 568 days.

This patent is subject to a terminal disclaimer.

(21) Appl. No.: 11/122,283

(22) Filed: May 3, 2005

(65) Prior Publication Data

US 2005/0271789 A1     Dec. 8, 2005

Related U.S. Application Data

(60) Provisional application No. 60/568,022, filed on May 3, 2004.

(51) Int. Cl.
*A23C 19/00* (2006.01)
(52) U.S. Cl. .................... 426/582; 426/34; 426/36; 426/580
(58) Field of Classification Search ............ 426/34, 426/36, 580, 582
See application file for complete search history.

(56) References Cited

U.S. PATENT DOCUMENTS

| | | | |
|---|---|---|---|
| 2,688,553 A | 9/1954 | Schicks et al. | |
| 3,741,774 A | 6/1973 | Burkwall, Jr. | |
| 3,961,077 A | 6/1976 | Kielsmeier | |
| 3,998,700 A | 12/1976 | Reinbold et al. | |
| 4,085,228 A | 4/1978 | Reinbold et al. | |
| 4,137,397 A | 1/1979 | Dutta et al. | |
| 4,244,983 A | 1/1981 | Baker | |
| 4,268,528 A | 5/1981 | Montigny | |
| 4,339,468 A | 7/1982 | Kielsmeier | |
| 4,343,817 A | 8/1982 | Swanson et al. | |
| 4,372,979 A | 2/1983 | Reinbold et al. | |
| 4,459,313 A | 7/1984 | Swanson et al. | |
| 4,460,609 A | 7/1984 | Kristiansen et al. | |
| 4,552,774 A | 11/1985 | Gronfor | |
| 4,592,274 A | 6/1986 | Tomatis | |
| 4,608,921 A | 9/1986 | Mongiello, Sr. | |
| 4,626,439 A | 12/1986 | Meyer | |
| 4,665,811 A | 5/1987 | Meyer | |
| 4,753,815 A | 6/1988 | Kielsmeier et al. | |
| 4,894,245 A | 1/1990 | Kielsmeier et al. | |
| 4,898,745 A | 2/1990 | Zamzow et al. | |
| 4,919,943 A | 4/1990 | Yee et al. | |
| 4,937,091 A | 6/1990 | Zallie et al. | |
| 4,957,749 A | 9/1990 | Prieels et al. | |
| 4,959,229 A | 9/1990 | Reddy et al. | |
| RE33,508 E | 12/1990 | Kielsmeier et al. | |
| 4,997,670 A | 3/1991 | Kielsmeier et al. | |
| 5,030,470 A | 7/1991 | Kielsmeier et al. | |
| 5,080,913 A | 1/1992 | Gamay | |
| 5,094,873 A | 3/1992 | Kerrigan et al. | |
| 5,104,675 A | 4/1992 | Callahan et al. | |
| 5,108,773 A * | 4/1992 | Smith et al. ................. | 426/582 |
| 5,200,216 A | 4/1993 | Barz et al. | |
| 5,215,778 A | 6/1993 | Davison et al. | |
| 5,225,220 A | 7/1993 | Gamay | |
| 5,234,700 A | 8/1993 | Barz et al. | |
| 5,240,724 A | 8/1993 | Otto et al. | |
| 5,244,687 A | 9/1993 | Rybinski et al. | |
| 5,277,926 A | 1/1994 | Batz et al. | |
| 5,330,780 A | 7/1994 | Yee et al. | |
| 5,336,765 A | 8/1994 | Au et al. | |
| 5,350,595 A | 9/1994 | Hockenberry et al. | |
| 5,380,543 A | 1/1995 | Barz et al. | |
| 5,395,630 A | 3/1995 | Gamay | |
| 5,413,804 A | 5/1995 | Rhodes | |
| 5,431,931 A | 7/1995 | Nauth et al. | |
| 5,431,946 A | 7/1995 | Vesely et al. | |
| 5,462,755 A | 10/1995 | Mehnert | |
| 5,466,477 A | 11/1995 | Sevenich | |
| 5,470,595 A | 11/1995 | Kopp et al. | |
| 5,480,666 A | 1/1996 | Lindgren | |
| 5,484,618 A | 1/1996 | Barz et al. | |
| 5,520,934 A | 5/1996 | Meilleur | |
| 5,529,795 A | 6/1996 | Aldrovandi | |
| 5,532,018 A | 7/1996 | Miller et al. | |
| 5,549,916 A | 8/1996 | Gamay | |
| 5,567,464 A | 10/1996 | Barz et al. | |
| 5,709,900 A | 1/1998 | Miller et al. | |
| 5,750,177 A | 5/1998 | Yee et al. | |
| 5,766,657 A | 6/1998 | Farkye et al. | |
| 5,895,671 A | 4/1999 | Adamany et al. | |

(Continued)

FOREIGN PATENT DOCUMENTS

WO    WO 02-089592 A1    11/2002

(Continued)

OTHER PUBLICATIONS

Miyamoto et al., Production of Lactobionic acid from whey by *Pseudomonas* sp., LS13-1, Biotechnology Letters 22, XP-002350037, Kluwer Academic Publishers 2000, pp. 427-430.

(Continued)

*Primary Examiner*—Leslie Wong
(74) *Attorney, Agent, or Firm*—Townsend and Townsend and Crew LLP

(57) ABSTRACT

Methods for preparing cheese blends of analog cheese and soft or firm/semi-hard, ripened or unripened, cheese are provided. The methods generally involve combining a slurry that contains the basic ingredients for an analog cheese and optionally one or more other ingredients with a mass of heated soft or firm/semi-hard cheese. Slurries that are used in the methods and cheeses produced by the methods are also provided.

23 Claims, 6 Drawing Sheets

U.S. PATENT DOCUMENTS

| | | |
|---|---|---|
| 5,902,625 A | 5/1999 | Barz et al. |
| 5,906,854 A | 5/1999 | Scherping et al. |
| 5,925,398 A | 7/1999 | Rizvi et al. |
| 5,942,263 A | 8/1999 | Chen et al. |
| 5,952,030 A | 9/1999 | Nelles et al. |
| 5,967,026 A | 10/1999 | Nelles et al. |
| 6,079,323 A | 6/2000 | Dzenis |
| 6,086,926 A | 7/2000 | Bruce et al. |
| 6,120,809 A | 9/2000 | Rhodes |
| 6,143,334 A | 11/2000 | Reinbold et al. |
| RE37,264 E | 7/2001 | Chen et al. |
| 6,319,526 B1 | 11/2001 | Dahlstrom et al. |
| 6,322,841 B1 | 11/2001 | Jackson et al. |
| 6,326,038 B1 | 12/2001 | Bradfford et al. |
| 6,358,543 B1 | 3/2002 | Soe et al. |
| 6,358,551 B1 | 3/2002 | Sadowsky et al. |
| 6,372,268 B1 | 4/2002 | Silver et al. |
| 6,426,102 B1 | 7/2002 | Isom et al. |
| 6,440,481 B1 | 8/2002 | Gascoigne et al. |
| 6,455,081 B1 | 9/2002 | Han et al. |
| 6,475,538 B2 | 11/2002 | Thakar et al. |
| 6,475,638 B1 | 11/2002 | Mitsuhashi et al. |
| 6,506,426 B2 | 1/2003 | Adamany et al. |
| 6,536,691 B2 | 3/2003 | Prewitt et al. |
| 6,645,542 B2 | 11/2003 | Nelles et al. |
| 6,773,740 B2 | 8/2004 | Hyde et al. |
| 6,872,412 B2 | 3/2005 | Soe et al. |
| 6,998,145 B2 | 2/2006 | Henry et al. |
| 2003/0104106 A1* | 6/2003 | Trecker et al. ............... 426/582 |
| 2004/0076729 A1 | 4/2004 | Jaskulka |

FOREIGN PATENT DOCUMENTS

WO     WO 2005-104859 A2     11/2005

OTHER PUBLICATIONS

Murakami et al., "Fermentative Production of Lactobionic Acid by *Burkholderia cepacia*", J. Appl. Glycosci #50, XP008036393, The Japanese Society of Applied Glycoscience 2003, pp. 117-120.

Rand, Jr., et al., "Direct Enzymatic Conversaion of Lactose in Milk to Acid," XP 000644502, Journal of Dairy Science, vol. 58, No. 8, Received Sep. 27, 1974, pp. 1144-1150.

Scott, R., "Chapter 13—Cheesemaking Operations," Cheesemaking Practice, Second Edition, pp. 2 cover pages and 186-212, 1986.

* cited by examiner

BLENDED CHEESES AND METHODS FOR MAKING SUCH CHEESES

CROSS-REFERENCES TO RELATED APPLICATIONS

This application claims priority to U.S. Provisional App. No. 60/568,022, filed May 3, 2004, and titled "Soft or Firm/Semi-Hard Ripened or Unripened Blended Cheeses and Methods of Making Such Cheeses", the entire contents of which are herein incorporated by reference for all purposes.

This application is also related to the following U.S. patent applications, all of which are incorporated herein by reference in their entirety for all purposes:

1. U.S. Provisional App. No. 60/568,029, filed May 3, 2004, entitled "Soft or Firm/Semi-Hard Ripened or Unripended Cheese and Methods of Making Such Cheeses,";
2. U.S. Provisional App. No. 60/568,017, filed May 3, 2004, entitled "Methods for Making Soft or Firm/Semi-Hard Ripened and Unripened Cheese,";
3. U.S. patent application filed on the same day as the present application, and entitled "Cheese and Methods of Making Such Cheese,"; and
4. U.S. patent application filed on the same day as the present application, and entitled "Methods for Making Soft or Firm/Semi-Hard Ripened and Unripened Cheese and Cheeses Prepared by Such Methods,".

BACKGROUND

In recent years there has been a significant increase in demand for cheese generally, as well as for cheeses with specific performance or nutritional characteristics. This general demand is driven in part by the steady growth in the ready meal or convenience food sector of the food industry since cheese is an ingredient in many foods within this sector. The increasing popularity of various pizza-type products is one specific example of cheese-containing products in this sector that have contributed to the surge in demand. Consumer's health concerns have been a major factor driving the increased demand for cheeses with improved nutritional characteristics, such as those that are lower in fat, differ in fatty acid profile, have increased calcium content, and/or are lower in cholesterol. These concerns, as well as cost considerations, have been the impetus for the development of a number of cheese analogs (e.g., imitation cheeses or cheese substitutes) that offer various health advantages (e.g., replacement of animal fat with healthier vegetable oil and increased vitamin or mineral levels) and cost benefits (e.g., vegetable oils are less expensive than certain dairy ingredients).

One general class of cheeses that are widely used are the "firm/semi-hard cheeses." These cheeses generally have percentage moisture on a fat free basis (MFFB) of about 54% or more, by weight. For example, firm/semi-hard cheeses may have a range of MFFB of about 54% to about 80%, by wt., or about 58% to about 75%, by wt. Examples of cheeses in this class include, for example, Colby, Havarti, Monterey Jack, Gorgonzola, Gouda, Cheshire, and Muenster. Other commonly used cheeses in this class are the "soft" cheeses. Soft cheeses typically have a MFFB of greater than about 60%, by wt. Mozzarella variety cheeses can be in the soft or firm/semi-hard categories, or in between the two, depending upon their composition. Standard mozzarella, for example, is designated as a soft cheese. Part-skim mozzarella is between soft and firm/semi-hard. Low-moisture mozzarella and low-moisture part-skim mozzarella are both designated as firm/semi-hard cheeses.

Some cheeses in the soft or firm/semi-hard categories are made by a process in which a cheese curd is heated and kneaded to improve the stretchability or stringiness of the final cheese, a characteristic desired by consumers in pizzas and related products. This process and related processes are sometimes referred to as a pasta filata process of manufacturing. Cheeses made by this process are known under a variety of names, including mozzarella, pasta filata, provolone, Mexican style, scamorze, and pizza cheese.

"Analog cheeses" (or cheese analogs) constitute a second major category of cheese. As alluded to above, there has been an increased demand for analog cheese because of cost and health considerations. Analog cheese generally refers to a cheese in which milk fat and/or a protein source has been substituted with a source that is not native to milk. Analog cheeses are typically lower cost than other cheese types because the processing can be performed less expensively and because certain milk ingredients can be substituted with cheaper products (e.g., substituting vegetable oil for milk fat). The health benefits derive from substitution of the milk fat and protein with other healthier substitutes and the ability to add other ingredients that can improve the nutritional characteristics of the final product.

Cheese analogues are typically categorized as dairy, partial dairy, or nondairy, depending on whether the fat and/or dairy components are from dairy or vegetable sources. They can also be classified as being an imitation cheese or a substitute cheese. Imitation cheese is a substitute for and resembles another cheese but is nutritionally inferior to that cheese. A cheese substitute, on the other hand, resembles another cheese but is not nutritionally inferior to that cheese.

Soft and firm/semi-hard cheeses and analogue cheeses have similar melt, flowability, and texture characteristics. The stretch of analogue cheese, however, is generally inferior to that of soft or firm/semi-hard cheeses. Analog cheeses also have a quick fat release and do not brown like conventional soft or firm/semi-hard products.

A third general category of cheese, namely blends of soft or firm/semi-hard cheese and an analog cheese (or simply cheese blends or soft or firm/semi-hard ripened or unripened blended cheeses), have been developed in an attempt to obtain some of the benefits associated with analog cheese while maintaining the desired stretch and browning characteristics of the soft or firm/semi-hard cheeses. Methods for preparing such blends typically involve blending the raw ingredients for an analog cheese with a soft or firm/semi-hard cheese curd or reworking a soft or firm/semi-hard cheese. The functional attributes of cheese blends, however, are generally like those of analogue cheese, with stretchability and browning characteristics that are inferior to those of soft or firm/semi-hard cheeses.

There thus remains a need for methods of making soft or firm/semi-hard ripened or unripened blended cheeses that result in improved performance and allow for greater control regarding incorporation of ingredients into the cheese so the final product has the desired functionality.

SUMMARY

Methods for making a variety of soft or firm/semi-hard blended cheeses are provided. Cheeses made by such methods and systems for performing the methods are also disclosed.

Some cheese preparation methods initially involve providing a slurry that comprises a plurality of analog cheese ingredients and separately preparing a heated cheese mass. The slurry is mixed with the cheese mass to form an admixture.

The resulting admixture is then shaped and cooled to form the cheese. Typically, the plurality of analog cheese ingredients are selected from the group consisting of water, a fat, a casein, a sequestrant, a starch, a salt, an acid, a flavoring agent and a vegetable oil. The methods can also involve one or more slurry processing steps such as heating the slurry, subjecting the slurry to high shear conditions, homogenizing the slurry and adjusting the water content of the slurry before the slurry is mixed with the heated cheese mass.

In some methods, the slurry further comprises one or more additional ingredients selected from the group consisting of a nonfat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

Further control over the final product can be achieved in methods in which one or more dry ingredients are added to the slurry, the cheese mass, or the admixture, whereby the admixture comprises the slurry, the cheese mass and the one or more dry ingredients.

Certain other cheese manufacturing methods involve combining a heated analog cheese slurry with a heated soft or firm/semi-hard cheese mass to form an admixture, with the slurry including a protein source, an oil or fat, water and a sequestrant. The resulting admixture is then shaped and cooled to form the soft or firm/semi-hard ripened or unripened blended cheese. In some instances, the slurry includes a starch, a dairy solid, a gum and/or a cellulose and the concentration of the starch, the dairy solid, the gum and the cellulose in the slurry is sufficient such that the soft or firm/semi-hard ripened or unripened blended cheese that is produced has one or more of the following characteristics (i) a starch concentration of at least 0.5 wt %, (ii) a dairy solid concentration of at least 0.5 wt %, or (iii) a gum or cellulose concentration of at least 0.5 wt. %, or at least 0.1 wt. %.

Methods for preparing a heated slurry for use in the preparation of a soft or firm/semi-hard ripened or unripened blended cheese are also described herein. Some of these methods involve blending a plurality of analog cheese ingredients together to form a slurry, the plurality of analog cheese ingredients selected from the group consisting of a protein source, an oil or fat, water and a sequestrant. The slurry is then heated to a temperature of about 90° F. to about 293° F. The slurry is also processed by performing one or more processes selected from the group consisting of subjecting the slurry to high shear conditions, homogenizing the slurry and adjusting the water content of the slurry to about 35-65 wt. %.

A variety of soft or firm/semi-hard ripened or unripened blended cheeses are disclosed. Some of these cheeses comprise a protein, an oil or a fat, and a sequestrant, and have one or more of the following characteristics (i) a starch concentration of about 0.5-26 wt %, (ii) a dairy solid concentration of about 0.5-35 wt %, or (iii) a gum or cellulose concentration of about 0.5-20 wt. %. Some cheeses have two of these characteristics and other cheeses have all three.

Slurries for use in the preparation of a soft or firm/semi-hard ripened or unripened blended cheese are also provided. Certain slurries include a protein source, an oil, and/or a fat, and a sequestrant. They have a temperature of about 90° F. to about 293° F. and have one or more of the following characteristics (i) a starch concentration of about 0.5-35 wt %, (ii) a dairy solid concentration of about 0.5-35 wt %, or (iii) a gum or cellulose concentration of about 0.01-6.0 wt. %.

DETAILED DESCRIPTION

I. Definitions

Figure 1A:
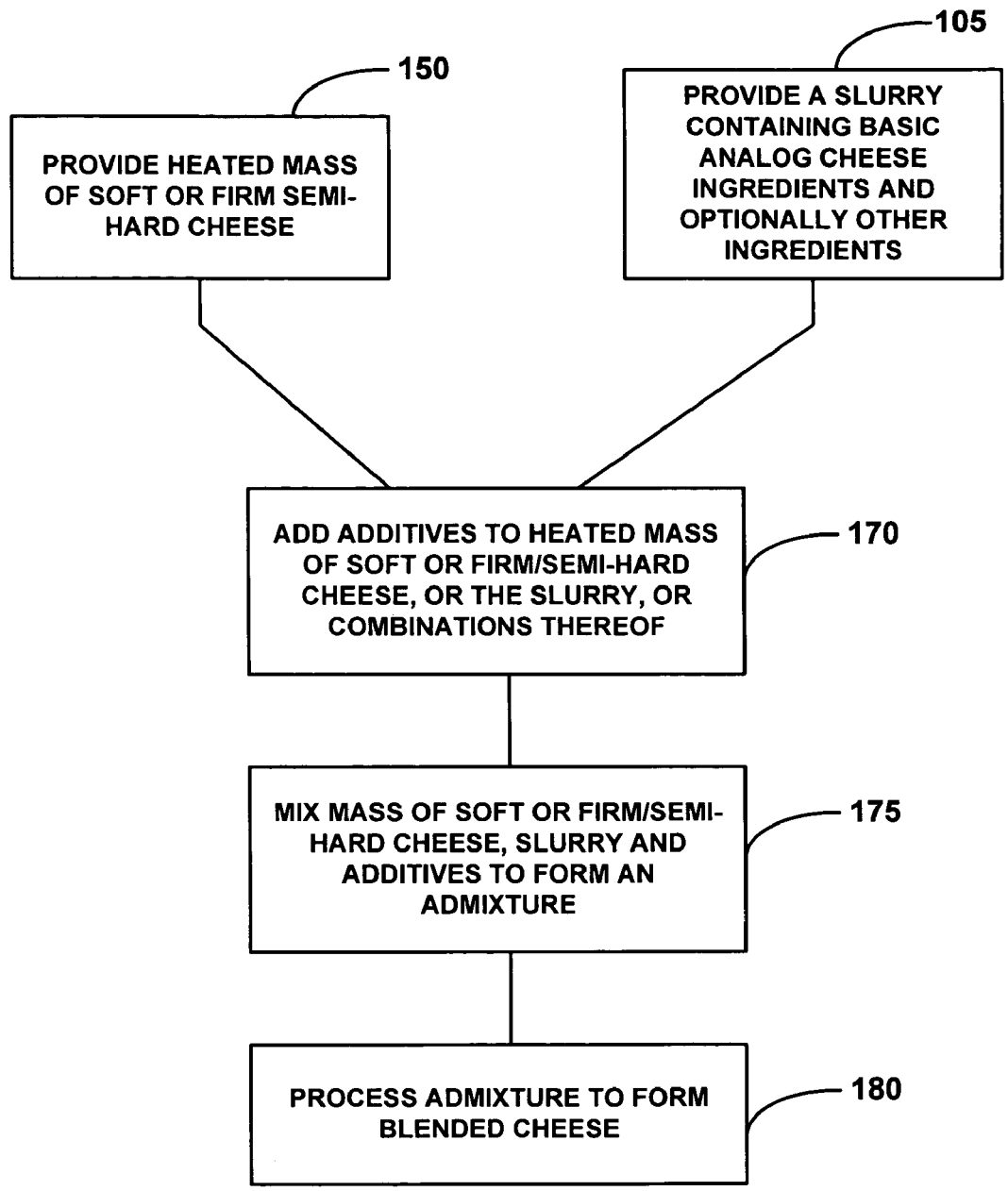
FIGS. 1A and 1B show in schematic form examples of certain methods that are disclosed herein to prepare soft or firm/semi-hard cheese.

A "soft or firm/semi-hard cheese" as used herein generally includes cheeses that have a percentage moisture on a fat free basis (MFFB) of about 54% or more, by weight. The term includes firm/semi-hard cheeses that have a MFFB, for example, of about 54% to about 80%, by wt., and cheeses with a MFFB, for example, of about 58% to about 75%, by wt. The term encompasses a variety of well known cheeses including, but not limited to, Colby, Havarti, Monterey Jack, Gorgonzola, Gouda, Cheshire and Muenster, which are examples of "firm/semi-hard cheeses." Also included in the term are popular "soft cheeses" such as cream cheese, and cottage cheese. Soft cheeses typically have a MFFB of greater than about 60%, by wt. A variety of Mozzarella cheeses may also be described as soft cheeses, and varieties of Mozzarella can be in the soft or firm/semi-hard category, or in between the two, depending upon their moisture content. Standard mozzarella, for example, is a soft cheese, part-skim mozzarella is between soft and firm/semi-hard, and low-moisture mozzarella and low-moisture part-skim mozzarella are both designated as firm/semi-hard cheeses. The term soft or firm/semi-hard as used herein includes cheeses meeting the CODEX definition of a soft or firm/semi-hard cheese. The term also includes soft or firm/semi-hard cheeses as defined by other local, regional, national or international agencies or organizations.

Cheeses within the "soft or firm/semi-hard" category as defined herein can be prepared using a variety of methods, including conventional methods, as well as by "alternative make" provisions. The term includes, for instance, cheeses made by a process in which a cheese curd is heated and kneaded to improve the stretchability or stringiness of the final cheese, provided the cheese falls within the MFFB parameters set above. This process and related processes are sometimes referred to as a pasta filata process of manufacturing. Cheeses made by this process are known under a variety of names, including mozzarella, pasta filata, provolone, Mexican style, scamorze, and pizza cheese. Cheeses made by alternative make procedures are prepared by alternative methods of making cheeses, so long as the procedure produces a cheese having the same physical and chemical properties of the type of cheese made by a specified process (e.g., a process specified by a regulatory agency) and falls within the MFFB parameters set forth above.

The "soft" and "firm/semi-hard" cheeses that are provided include standard and non-standard cheeses having the foregoing moisture characteristics. Standard cheeses are those that satisfy the standards as set forth by a regulatory body with respect to a particular type of cheese. A non-standard cheese is one whose composition does not meet the standard. A soft or firm/semi-hard cheese can also be a processed cheese. A soft or firm/semi-hard cheese can also be ripened or unripened.

"Mozzarella" cheese has a minimum milkfat content of 45% by weight of the solids and a moisture content of more than 52% but not more than 60% by weight. "Low-moisture mozzarella" cheeses have a minimum milkfat content of 45% be weight of the solids and the moisture content is more than 45% but not more than 52% by weight. "Part-skim mozzarella" has a moisture content of more than 52% but not more than 60% by weight, and a milk fat content that is less than 45% but not less than 30% calculated on the solids basis. "Low-moisture part-skim" mozzarella has a moisture content of more than 45% but not more than 52% by weight and a milkfat content, calculated on the solids basis, of less than 45% but not less than 30%. Further details regarding these various mozzarella cheeses is provided by 21 C.F.R. §1.33.155-133.158.

An "analog cheese" as used herein refers generally to a cheese in which a milk fat and/or a protein source has been substituted with a source that is not native to milk. The basic ingredients for an analog cheese are usually water, casein, a fat/oil and a sequestering agent. Cheese analogues are typically categorized as dairy, partial dairy, or nondairy, depending on whether the fat and/or dairy components are from dairy or vegetable sources. They can also be classified as being an imitation cheese or a substitute cheese. Imitation cheese is a substitute for and resembles another cheese but is nutritionally inferior to that cheese. A cheese substitute, on the other hand, resembles another cheese but is not nutritionally inferior to that cheese.

"Soft or firm/semi-hard blended cheese" refers to cheeses that generally are combinations of a soft or firm/semi-hard cheese and an analog cheese or a cheese that includes the ingredients from these two general classes of cheeses.

The term "cream" means the liquid milk product high in fat separated from milk which may have been adjusted by adding thereto: milk, concentrated milk, dry whole milk, skim milk, concentrated skim milk, nonfat dry milk or other GRAS ingredients. "Whey cream" is the liquid milk product high in fat separated from whey (cheese, casein, or other), which may have been adjusted by adding thereto: whey, concentrated whey, dry whey, or other GRAS ingredients. "Procream" is the liquid milk product high in fat collected as retentate from a whey filtration process such as microfiltration which may have been adjusted by adding thereto: whey, concentrated whey, dry whey, or other GRAS ingredients.

II. Overview

Methods for preparing soft or firm/semi-hard ripened or unripened blended cheeses are provided that generally involve forming a heated slurry or molten mass that includes the basic ingredients for an analog cheese (e.g., water, a protein (e.g., casein) or a protein replacer (e.g., starch), a fat/oil, and a sequestering agent). This analog cheese slurry is subsequently combined with a heated mass of soft or firm/semi-hard cheese. The analog cheese slurry can also contain one or more additional ingredients (in powder or liquid form) that are selected in accordance with the desired final cheese composition. Once the analog cheese slurry and mass of soft or firm/semi-hard cheese are thoroughly mixed together, the resulting admixture is processed to yield the final soft or firm/semi-hard ripened or unripened blended cheese product. This approach differs, in part, from the conventional methods for making soft or firm/semi-hard ripened or unripened blended cheeses, which typically involve simply blending the ingredients for an analog cheese directly with a cheese curd then heating the admixture to temperatures greater than 150° F.

When dairy milk is used as a precursor, the sweet cream fraction of the milk, or a portion thereof, may be separated and replaced by other types of creams, fats, and/or oils (e.g., vegetable oil), prior to curd forming. For example, the sweet cream may be replaced by whey cream and/or pro-cream (i.e., a mixture of protein and cream) that is included with the whey fraction that is separated from the cheese curd. The replacement of the dairy sweet cream, or a portion thereof, with the whey cream, pro-cream, and/or oil (e.g., vegetable oil), reduces waste by making use of the whey cream and pro-cream, as well as making the higher value sweet cream available for sale in the marketplace.

The methods that are provided can also be used to introduce various ingredients into the final cheese product that can impact: 1) melt and flowability of the final cheese product, which is a measure of how well the cheese melts and flows into a homogenous mass, preferably with little or no individual shreds of cheese still detectable; 2) stretch, which is measure of the ability of the cheese to form interconnected strings when the heated cheese is pulled; 3) texture, which is a measure of chewiness and smoothness; 4) coloring, which is a measure of the actual color of the melted cheese; 5) blister characteristics, which may include size, color and extent of coverage; and/or 6) nutritional composition.

The use of a slurry in the methods disclosed herein may also provide significant improvements in yield. A typical cheese process in its basic approach involves forming acidifying and coagulating milk to form a coagulum that contains cheese curd and whey, removing the whey from the curd, and then processing the curd into a final cheese product. The whey that is removed in conventional cheese manufacturing often contains many dissolved or suspended ingredients, which often means that a significant quantity of dissolved substances (e.g., protein, fat, carbohydrate and minerals) are lost when the whey is separated from the curd. If any ingredients are added before the whey is separated from the curd, many of these ingredients, because they are at least partially soluble in the whey fraction, are also lost.

As a specific example of the extent of this problem, for each 100 pounds of milk that is used to prepare cheese, it is not uncommon using conventional cheese manufacturing techniques to only be able to produce 10 pounds of cheese. By using some of the slurry-based methods that are disclosed herein, the yield can be increased in some instances to about 15, 18, 20 22, 25 or 50 or more pounds of cheese for each 100 pounds of milk. Thus, with some methods, the yield can be increased by 1.5-2 times or more. The increase in yield is due in part to the use of slurries that allow ingredients to be combined with a heated mass of cheese curd, a process in which essentially all the ingredients in the slurry are retained. This is in contrast to methods in which ingredients are added to milk in which case a significant proportion of added ingredients are lost.

One approach is to add the non-fat dry milk to the milk that is used to prepare the cheese. If added at this stage, it is not uncommon for about 75% of the non-fat dry milk to be lost, including proteins, lactose and minerals in the non-fat dry milk. If the non-fat dry milk is instead incorporated into some of the slurries that are provided and the resulting slurry mixed with, for instance, into a heated mass of soft or firm/semi-hard cheese as described herein, much, if not essentially all, of the non-fat dry milk may be incorporated into the final cheese product.

In some methods, the slurry is processed so it is in a form that confers useful properties on the final cheese product and/or facilitates preparation of the cheese. Some methods, for instance, utilize a heated slurry that may also have been sheared and/or homogenized. Such processing can influence the performance of the final cheese product in various ways. For example, this processing can be used to achieve higher concentrations of certain ingredients in the final cheese product as compared to traditional approaches. Without intending to be bound by theory, it is believed that the shearing and homogenization process can reduce particle size of the components of some cheese ingredients. These resulting particles because of their reduced size are thus better able to be incorporated into the overall cheese matrix, thereby allowing more ingredient to be introduced into the final cheese product.

The reduced particle size also makes it easier to remove excess water during the manufacturing process to the level desired in later manufacturing stages. The ability to control water content is an important factor in being able to regulate the stability of cheese and thus its shelf life. Reduced particle size also facilitates forming a compact cheese that can be easily processed (e.g., shredded, sliced, or diced). Shearing and homogenization can also be important in reducing the viscosity of the slurry, which aids in various processing steps (e.g., transport of the slurry).

Use of a slurry that has been heated, sheared and/or homogenized during the manufacturing process also is useful in activating, exposing the functionality and/or in hydrating the ingredients, such that the ingredient has different properties than the corresponding unheated ingredients. As a specific example, it can be difficult to incorporate non-fat dry milk into a cheese as a dry powder in certain cheese manufacturing methods because the non-fat dry milk never becomes fully hydrated. This makes the non-fat dry milk susceptible to burning when cooked, for example. By using certain of the slurry-based methods disclosed herein, ingredients such as non-fat dry milk can be better hydrated, thus mitigating against the burning problem. The hydration of other ingredients can have other beneficial results.

Some methods also involve a process in which the water content of the slurry is adjusted. This is useful because the water content in a cheese is an important factor in stability, shelf life and the ability to slice, shred and dice the final cheese product.

In sum, the use of slurries to introduce ingredients into cheeses at certain stages of the manufacturing process can be used to help tailor the performance and nutritional characteristics of the final cheese product.

III. Methods for Preparing Soft or Firm/Semi-Hard Ripened or Unripened Blended Cheeses A. General FIG. 1A shows in schematic form manufacturing process 100, which is one example of a general approach for manufacturing a soft or firm/semi-hard ripened or unripened blended cheese. Method 100 generally involves: 1) providing 105 a analog cheese slurry that includes the basic ingredients for making analog cheese and optionally other ingredients; 2) separately providing 150 a heated soft or firm/semi-hard cheese mass (heated cheese mass); 3) adding ingredients 170 to the slurry, heated cheese mass or a combination thereof; 4) mixing 175 the heated slurry with the heated cheese mass to form an admixture; and 5) processing 180 the admixture to form the soft or firm/semi-hard ripened or unripened blended cheese product.

The slurry is typically heated, but this is not mandatory. The addition of the ingredients to the slurry is also optional and some methods do not include this step. If performed, however, the ingredients that are added are, at least in some instances, ones that are heat sensitive and thus ones that cannot tolerate the heat to which the slurry may be heated.

1. Preparation of Analog Cheese Slurry and Pre-Mixing Process

In some methods, the process of providing the slurry/molten analog cheese mass comprises several aspects. Some methods, for example, initially involve blending a plurality of analog cheese ingredients and optionally other additional ingredients together to form the slurry. The resulting slurry is then subjected to a pre-mixing process to adjust the slurry to a form that will integrate well with the heated cheese mass with which the slurry is mixed. The pre-mixing process typically includes cooking the slurry, usually to about 90-293° F. (32-145° C.) or 100-250° F. (38-121° C.). But, as just noted, this is not required in some applications. This pre-mixing processing also optionally includes one, two or all of the following processes: (1) subjecting the slurry to high shear conditions, (2) homogenizing the slurry (e.g., thoroughly mixing the ingredients and the water of the slurry together), and/or (3) adjusting the water content of the slurry, usually to about 35-65 wt. %, or 45-60 wt. %.

Different methods can incorporate different combinations of two or all three of the foregoing optional processes. So, for example, in some methods, the pre-mixing processing involves (1) and (2) but not (3). Other processes include (1) and (3) but not (2). Still other pre-mixing processes include (2) and (3) but not (1). And still other processes include (1), (2) and (3). The other remaining combinations can also be utilized depending upon the particular requirements of an application. In some instances, it is sufficient to simply shear the slurry without homogenizing it. But the pre-mixing process may involve both, in which case the slurry is first typically sheared and then homogenized, although the order can be reversed.

In some methods, some of the pre-mixing processes are optionally carried out at the same time (e.g., subjecting the slurry to high shear conditions while homogenizing the slurry; or heating the slurry while subjecting it to high shear conditions and/or homogenizing the slurry). Cooking can optionally be performed during the shearing and/or homogenizing. In general, however, the pre-mixing processing steps conclude by adjusting the water content of the slurry which, if performed, is the last of the pre-mixing processing steps.

Some ingredients need to be subjected to high shear conditions to become functional (e.g., hydrated). High shear conditions as used herein generally refers to conditions in which 10,000 to 500,000 $s^{-1}$ of shear is applied. In some methods, the slurry is typically sheared by a high-shear mixer or colloid mill, at a temperature of about 90 to 293° F. (32 to 145° C.) for about 0.01 to 0.5 seconds.

Homogenization of the slurry, if performed, generally involves the process of reducing the particle size of fluid products under conditions of extreme pressure, shear, turbulence, acceleration and impact, to make them more stable and have a better texture. The effect is achieved by forcing the product through a special homogenizing valve at a very high pressure. Homogenization can be done in one or multiple steps. For most methods, two steps are sufficient. It is common that the main homogenization takes place in the first homogenization valve and a mild homogenization in the second valve. The second homogenization valve will enhance the product quality. It will break down the newly formed fat globule clusters formed directly after the first valve. Homogenization is usually conducted at a temperature of about 90-293° F. (32-145° C.) or 100-250° F. (38-121° C.) for about 0.001-0.50 seconds.

As indicated above, if the water content of the slurry is adjusted, the moisture content is generally adjusted to about 35-65 wt. %, and in some instances from about 37-60 wt. %. After such processing, the slurry that is mixed with the heated cheese mass, generally has a temperature of about 100-170° F. (37-77° C.), or about 120-160° F. (49-71° C.). It also generally has a viscosity of 1000 to greater than 1,000,000 centipoise in this temperature range.

2. Preparation of Heated Cheese Mass

Various processes can also be used to prepare the heated soft or firm/semi-hard cheese mass. One approach, however, is to form a cheese curd and then heat and knead it in a cooker/mixer to form the desired heated cheese mass. The heating and kneading process is generally done at a temperature of about 120-155° F. (48-69° C.) for a time of about 1-15 min. This process can be conducted using (direct/indirect) steam heating or by other approaches. Typically, the resulting mass has a temperature from about 120-150° F. (48-66° C.). The heating and kneading process can be conducted simultaneously or separately.

The cheese curd that is introduced into mixer/cooker can be prepared, for example, from pasteurized cow's milk, buffalo milk, goat's milk or other milk source (e.g., concentrated milk, reconstituted milk or milk protein powders). The milk is acidified to form cheese milk. The acidification step can be performed either microbially, directly, or a combination of microbial and direct acidification. Microbial acidification is accomplished by the addition of a starter culture of one or more lactic acid-producing bacteria to the milk, and then allowing the bacteria to grow and multiply. When making a mozzarella variety cheese, a bacterial starter culture composed of coccus, rods, or a combination of both is preferably used. In some methods of acidification, an acid added as a processing aid, such as acetic acid (e.g., vinegar), phosphoric acid, citric acid, lactic acid, hydrochloric acid, sulfuric acid, or glucono-delta lactone (GdL), lactobionic acid, etc., is added to standardize pH and is followed by addition of microbial starter to complete the acidification process.

Following acidification, the cheese milk is coagulated to form a coagulum that consists of cheese curd and whey. Rennet (Microbial or Calf) or another suitable enzyme is typically added to the milk to enhance the coagulation activity. The resulting coagulum is cut and the whey drained off to obtain the cheese curd. The curd can optionally be scalded (cooked) for about 0.08 to 1.0 hours at about 86-120° F. (30-49° C.), at which point the curd is ready to undergo the heating and kneading operation.

In some methods, ingredients can also be incorporated into the curd or during the curd preparation. Thus, these ingredients can be mixed into curd ingredients or mixtures thereof, into the coagulum or into the curd itself, for example.

The heating and kneading process is generally conducted under low shear conditions. Heating can be conducted, for example, in a kneading mixer/extruder via 1) immersion in hot water or brine, 2) direct steam injection, 3) indirect heating via an indirect heat exchange, and/or 4) microwave heating. The steam injection option generally involves releasing live steam into the kneading and stretching chamber. When live steam is used to heat the curd, the steam condensate is absorbed by the curd and forms part of the final mass of cheese. When using live steam in the mixer/cooker, typically the water content of the curd immediately prior to entering the mixer/cooker is about 45 to 65 wt.%, and sufficient steam is released into the kneading and stretching chamber such that the water content of the mass of cheese immediately after exiting the machine is up to about 5 percentage points higher, e.g., about 0.5 to 10 points higher. Often, it will be about 2.5 to 8.5 points higher. So, for example, if the water content of the curd entering the machine is 45 wt.%, then usually the amount of injected steam that is used to bring the curd up to the necessary temperature to obtain a homogenous, fibrous mass of cheese will be an amount that raises the water content to no more than about 50 wt.%. Indirect heating can be accomplished, for example, by conduction, through the wall of the kneading and stretching chamber, e.g., by use of a hot water jacket.

Heating and kneading can be performed in the absence of any exogenous water. By "exogenous water" is meant water that is used to bathe the curd and which is subsequently separated from the homogenous cheese mass that is formed. A shortcoming of the use of exogenous water during the heating and kneading process is that, when the water is separated, valuable protein, fat, and other solids that otherwise would be bound up in the finished cheese are removed.

Kneading is often accomplished by working the heated cheese curd with pressure via single or dual helical intermeshing screws. The whole of the heating and kneading step is sometimes referred to as a plasticization or pasta filata process, which refers to the heating of curd to around 120-155° F. (48-69° C.) and kneading the hot curd. Successful plasticization of the curd requires that the viscoelastic paracasein matrix undergoes limited flow and stretches without breaking. Plasticization is believed to be accompanied by changes at a microstructure level within the curd, including partial aggregation and tightening of the paracasein gel matrix followed by formation of linear paracasein fibers with high tensile strength. The cheese fat coalesces into elongated pools entrapped between paracasein fibers showing their same orientation. This process aids in obtaining the proper functionality in the final product.

The heating and kneading process described herein ensure complete mixing of the heated curd. This is important because incomplete mixing results in the separation of fat and water and the loss of these ingredients and other ingredients such as fat, lactose and minerals.

3. Optional Addition of Ingredients

Ingredients of a variety of types can optionally be added, for example, to the heated cheese mass, the heated analog cheese slurry, or the admixture formed after the heated slurry and heated cheese mass are mixed together. These ingredients are often added in a dry form (e.g., as a powder), but in some instances can be added in liquid form. Powdered solids can be added using any of a number of conventional approaches, including sprinkling the solids onto the cheese, usually across the entire surface of the cheese and typically after application of agents or ingredients in liquid form, if any. Liquid agents or ingredients can be sprayed down onto the surface of the cheese, usually in a spray that covers substantially the entire surface of the cheese. Ingredients can be mixed together at once or blended in several steps before being added.

4. Mixing of Slurry and Cheese Mass

The heated slurry, the heated cheese mass and any optional ingredients are combined in a mixer to form an admixture. Typically, the mixing is performed at a temperature of about 120 to about 170° F. (49-77° C.). The temperature in some applications is relatively high, such as between 150-170° F. (66-77° C.). In other methods, the temperature is at or slightly below that of pasteurization (65° C., 150° F.), for example in the range of about 120-150° F. (49-65° C.). Mixing is usually conducted for about 2-15 or 5-10 minutes is generally performed under low shear conditions. The slurry and heated cheese mass are typically combined in a ratio of about 95:5 to about 5:95.

5. Final Processing

Final processing of the slurry generally involves shaping and cooling the slurry to form a desired final product. In general, the slurry containing the heated and/or soft or firm/semi-hard ripened or unripened blended cheese curd can be formed into any desired shape depending upon the ultimate intended use. General options include, but are not limited to, 1) forming relatively large pieces of cheese which are packaged; 2) comminuting the cheese into smaller pieces that are packaged without freezing but instead refrigerated; 3) comminuting, packaging and freezing the cheese, and 4) comminuting, freezing, then packaging the cheese.

In some methods, for instance, the slurry is extruded as a continuous dimensionally flat Ribbon™, which is discharged into a cold sodium chloride brine channel or tank, for example as described in U.S. Pat. No. 4,339,468 to Kielsmeier or U.S. Pat. No. 5,200,216 to Barz et al. (both of which are incorporated by reference herein in their entirety). The cheese Ribbon™ is sometimes contacted with cold sodium chloride brine (in one or more tanks or vessels) until its core temperature drops to about 75° F. (24° C.) or below. Then the cooled Ribbon™ can be cut into segments having dimensions suitable for the intended use of the cheese.

Other options include: 1) floating the cheese in a coolant; 2) placing the cheese on a perforated belt and spraying coolant on the cheese surface; 3) placing the cheese on a solid belt and spraying coolant on the underside of the belt; 4) transfer through a cooling chamber; and 5) refrigeration of the heated cheese.

If a string cheese is the desired product [e.g., a cheese having a diameter of about ⅛ to 1.0 inch (0.32 to 2.54 cm.)], the segments of the string are generally about 1½ to 12 inches (4 to 30.5 cm) long. If the string cheese is to be baked only while enclosed in pizza crust (e.g., in a stuffed crust pizza), it typically is unnecessary to age the cheese before using it. If desired, the string cheese can be frozen and stored.

The warm cheese can also be molded/extruded into blocks of any of a variety of sizes that are convenient. Some blocks, for example, are about 4 inches high, 4-8 inches wide, and 4-24 inches long.

If the finished cheese is to be used as an exposed topping for a pizza, then the continuous dimensionally flat Ribbon™, typically is rectangular in cross section, and can be cut into loaves, for example having a width of about 4 to 36 inches (10 to 92 cm.), a height of about 1/16 to 4 inches (0.15 to 10 cm.), and a length of about 4 to 36 inches (10 to 92 cm.). The loaves can then be further cooled in sodium chloride brine, for example to a core temperature in the range of about 26 to 75° F. (−3.3-24° C.), and then removed from the brine and comminuted, and the pieces individually quick frozen, for example by the process described in U.S. Pat. No. 5,030,470 to Kielsmeier, et al., which is hereby incorporated herein by reference.

Depending on the composition of the cheese, it may be preferable to store it for a time [e.g., about 7 to 21 days, at about 35 to 45° F. (2 to 7° C.)] after it is removed from the last brine tank and before it is comminuted and frozen. However, as described in U.S. Pat. No. 5,200,216 (Barz et al.), if the process is controlled such that the cooled cheese removed from the brine has a moisture content of about 45 to 60 wt. %, a milk fat content of at least about 30 wt. % (dried solids basis), and a combined moisture and wet milk fat content of at least about 70 wt. %, the cheese can be frozen immediately and will still perform satisfactorily when baked on a pizza, under a variety of conditions.

The final processing procedure can also be as described in U.S. Pat. No. 5,902,625, which is incorporated herein by reference in its entirety for all purposes.

The methods described herein can be conducted in a batch format or continuously. Batch methods, for example, involve providing batches of slurry and the heated soft or firm/semi-hard cheese mass that are subsequently combined in batches. The resulting mixtures are subsequently processed to obtain the desired final cheese product. The process is then repeated.

In continuous methods, at least the slurry preparation process and the process in which the slurry is combined with the cheese mass is conducted in a continuous process. In some methods, essentially each of the steps listed above are conducted continuously such that slurry preparation, preparation of the heated mass of soft or firm/semi-hard cheese, combining of the slurry and cheese mass, optional addition of ingredients, and final processing steps are all continuously ongoing.

B. Exemplary Method

Figure 1B:
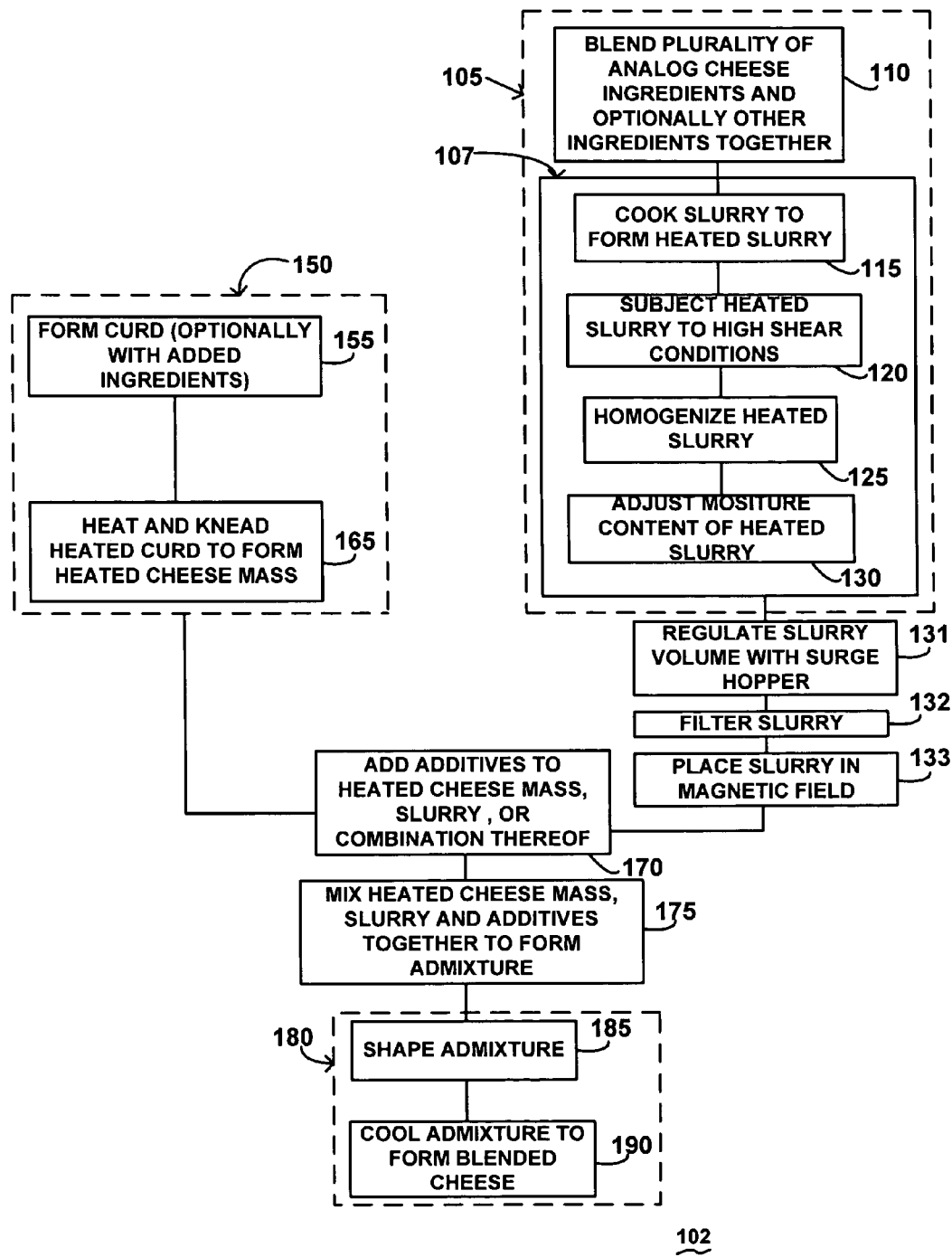

FIG. 1B illustrates one example of how the heated analog cheese slurry and heated soft or semi-soft cheese mass can be combined to form an admixture that can subsequently be processed to yield a final soft or firm/semi-hard ripened or unripened blended cheese product. In this particular method 102, the slurry preparation process 105 initially involves blending 110 a plurality of analog cheese ingredients and other optional additional ingredients together to form an initial slurry. The pre-mixing process 107 involves cooking/heating 115 the resulting slurry to about 90-293° F. This heated slurry is subsequently subjected 120 to high shear conditions and then homogenized 125. Thereafter, the water content of the heated slurry is adjusted 130 to 35-65 wt. %. The slurry is transferred to the combining and mixing state 170 through the use of a pump at the discharge of a surge hopper, which maintains the slurry at a constant volume 131. As the slurry is transferred, it may be filtered 132 to remove any large particles formed in the slurry during the cooking/heating step 115 (or other extraneous materials), and also exposed to a magnetic field 133 to remove any metal fragments in the slurry generated by metal to metal contact of the moving parts of the process equipment.

As further shown in FIG. 1B, the process of providing 150 a heated cheese mass in this particular method includes several aspects. The process is initiated by forming 155 a cheese curd. Once formed, the cheese curd may be heated and kneaded 165 to form the heated cheese mass. During the heating process, the curd is typically heated to the temperature listed above. If desired, ingredients can be added to the curd or at any stage during preparation of the curd (e.g., initial ingredients, mixtures of ingredients and coagulum).

This particular method includes a process of adding 170 one or more optional ingredients to the slurry, the heated cheese mass or the combined slurry and cheese mass. But as noted above, this is an optional process and not all methods include this process. The slurry, heated cheese mass and ingredients are then thoroughly mixed 175 together to form an admixture. The admixture that is formed is subsequently processed 180 to form the final soft or firm/semi hard cheese product. In the particular method depicted in FIG. 1B, final processing 180 involves shaping 185 the admixture into a desired form and cooling 190 the shaped cheese to form the final soft or firm/semi-hard ripened or unripened blended cheese product. Although FIG. 1B shows the final processing step to first involve the shaping process followed by the cooling process, this order can be reversed or performed simultaneously.

The final processing 180 of each of the exemplary methods shown in FIGS. 1A and 1B can involve any of the processing options described above or generally known in the art. So, for example, in some methods final processing involves individually quick freezing pieces of the cheese as described in U.S. Pat. No. 5,030,410. Other methods involve a same day dice procedure such as described, for example, in U.S. Pat. No. 5,200,216. In still other methods, the cheese is not comminuted but formed into blocks that are directly packaged and refrigerated. Those of skill will recognize that a variety of other processing options are available.

IV. Slurry Ingredients and Non-Slurry Ingredients

In general, the ingredients incorporated into the slurry typically include the basic ingredients for forming an analog cheese and optionally other additional ingredients selected to impart a desired characteristic on the final soft or firm/semi-hard ripened or unripened blended cheese product. These various types of ingredients are discussed in greater detail below.

A. Basic Analog Cheese Ingredients

The analog cheese ingredients most commonly included in the blending process are water, a protein (e.g., casein) or a protein replacer (e.g., starch), a fat/oil and a sequestering agent. All of these ingredients, however, are not required. A processing aid is sometimes included, too. These analog cheese ingredients are described more fully below.

Protein (e.g., casein). Casein is a phosphoprotein by-product of the dairy industry and can be isolated by several methods, but is typically prepared from skim milk. The physical properties and chemical composition of the casein obtained depend upon the source of the milk, its quality and the isolation procedure.

Different forms of casein can be utilized in the methods described herein, but in general typically are tasteless, odorless, and noncrystalline. Suitable caseins include, for example, but are not limited to, acid caseins, rennin caseins, neutral caseins and sodium and calcium caseinates. There are several principal methods for producing casein from milk. One method involves the acid precipitation of casein at its isoelectric point, which is about pH 4.6, to form acid casein. Examples of acid caseins include lactic acid casein, hydrochloric acid casein and sulfuric acid casein. Another approach involves enzymatic coagulation using rennin or another suitable enzyme; this approach yields rennin casein. Methods for forming neutral caseins are discussed in U.S. Pat. No. 4,016,298. Sodium caseinates can be formed by converting the casein from its calcium form to a sodium caseinate by treating the milk with sodium citrate, for example.

The amount of casein incorporated into the slurry generally ranges from about 5-65 wt. %. In some instances, its concentration ranges from about 10-65, or from about 10-40 wt. %. This results in a casein concentration in the final soft or firm/semi-hard ripened or unripened blended cheese of about 5-65 wt. %, or about 10-40 wt. %.

Protein Replacers. Various ingredients can be used to substitute fully or partially for added protein. Starches are one example. The types and amount of starch that can be included in the slurry and the final cheese product is described below.

Water. The water is added into the slurry in an amount that is sufficient to ensure that the other ingredients are adequately hydrated. Water typically accounts for about 35-65, or about 45-60 wt. % of the slurry. The moisture content in the final soft or firm/semi-hard ripened or unripened blended cheese product is generally about 35-60, or about 45-60 wt. %.

Oil/Fat. The oil/fat component may be of any edible type. The preferred kind of oil/fat is one with a bland flavor that has physical characteristics (such as solid fat index) similar to that of butterfat. A fat utilized in the slurry can be any relatively low melting point vegetable or animal fat, but preferably is a liquid at a temperature of less than 130° F. (melting point of less than 130° F.). In some instances, the melting point is between 20-130° F., e.g., between 40-125° F., or between 50-120° F. Vegetable fats such as those derived from coconuts, soybeans, safflower, corn and cotton are sometimes preferred because they are not as difficult to preserve such as some animal fats (e.g., butterfat). Suitable oils/fat include, but are not limited to, safflower seed oil, corn oil, soybean oil, peanut oil, olive oil, palm oil, flax seed oil, fish oil, walnut oil, and mixtures of one or more of these oils. Additional examples of suitable oils include, but are not limited to, vegetable oils, linoleic acid, omega 3 fatty acids, and medium chain triglycerides, among others. Such oils may be hydrogenated or partially hydrogenated.

The amount of oil/fat included in the slurry can vary, but generally ranges from about 0-40 wt. %, or from about 5-35 wt. %. The amount of oil/fat in the final soft or firm/semi-hard ripened or unripened blended cheese product thus generally ranges from about 0-38 wt. % or from about 5-36 wt. %.

Sequestrants. A number of different sequestrants can be included to keep the various ingredients in solution. As used herein, the term sequestrants is intended to include, but not be limited to, the chemical agents sometimes referred to as chelating agents. If a sequestrant is used, it generally is one that sequesters calcium ions in the cheese (i.e., it reduces the degree to which the calcium is ionically bound to the protein in the cheese).

Calcium-binding sequestrants are sometimes used, particularly phosphates and citrates, with the sodium and sodium aluminum salts being the ones most typically used. Examples of suitable phosphates are sodium hexametaphosphate (SHMP), monosodium phosphate (MSP), sodium tripolyphosphate (STPP), and disodium phosphate (DSP), sodium aluminum phosphate, disodium phosphateDSP. DSP is generally available in its hydrated form, disodium phosphate dihydrate. Sodium citrate is commonly used and is available in solid form as sodium citrate dihydrate.

Sequestrants, if included, typically are added such that the concentration in the slurry ranges from about 0.1-4 wt. %, such as 0.25-3 wt. % or 0.4-2.5 wt. %. The concentration in the slurry, however, is controlled so the concentration in the final cheese product is generally within the range of about 0.001-3.8%, based on the weight of the finished cheese. Often, about 0.1-3.0% of the sequestrant will be used, or an amount within the range of about 0.25-2.0%.

B. Additional Ingredients

A number of different types of generally recognized as safe (GRAS) ingredients can be introduced during the methods to tailor the nutritional or performance characteristics of the final cheese product. These ingredients can be added at a number of different points along the manufacturing process, including: 1) during blending of the analog cheese ingredients (e.g., at step 110 of the method shown in FIG. 1B); 2) to the cheese curd or the processing of making the cheese curd prior to heating it (e.g., during step 155 of FIG. 1B); and/or 3) during mixing of the analog cheese slurry and the heated mass of soft or firm/semi-hard cheese (e.g., at mixing step 170 of the method shown in FIG. 1B). For ease of reference, this latter period is referred to simply as the "mixing stage", although it is reiterated that the ingredients added at this stage can be added to the slurry, the heated cheese mass or the combined slurry and cheese mass. If added at a stage other than the slurry, most ingredients can generally be added as a powder or as part of a solution.

As noted above, some of the ingredients included in the slurry generally fall into two general categories: 1) ingredients that one seeks to incorporate at relatively high concentration levels; and 2) ingredients that need to be heated and/or hydrated to become functionalized, i.e., to be converted into a form that has the chemical and/or physical properties that are important for imparting the desired characteristics to the final cheese product. But a variety of other ingredients can also be included in the slurry to control the functional and nutritional characteristics of the final product.

The ability to also add ingredients at various points along the overall process provides an additional level of control in tailoring the composition of the final product. For example, the addition of ingredients during the process in which the slurry and heated cheese mass are mixed (i.e., at the mixing stage) provides an opportunity to incorporate ingredients that 1) are best added as dry ingredients, 2) cannot tolerate the high temperatures (or shearing or homogenizing conditions) to which the slurry is subjected, and/or 3) do not require hydration to render the ingredient functional.

Ingredients that can be included in the slurry or added at other points along the manufacturing process include, but are not limited to, nonfat dry milk, a milk protein, an acidity regulator, an acid, an anticaking agent, an antifoaming agent, a coloring agent, an emulsifier, an enzyme preparation, a flavoring agent, a finning agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

Additional specific information regarding the types of ingredients that can be incorporated to tailor the performance, nutritional and taste characteristics of the final soft or firm/semi-hard cheese product follow.

Dairy Solids. A dairy solid can be added to improve various characteristics of the final cheese products such as: firming the cheese, improving water binding capacity, improving the melt appearance of the cooked cheese, and/or increasing the blistering of the cooked cheese. Dairy solids that can be utilized include, but are not limited to, whey protein concentrate, casein hydrolyzate, milk fat, lactalbumin, cream, milk protein concentrate, milk protein isolate, lactose, casein, whey protein isolate, hydrolyzed whey protein, denatured whey protein, skim cheese powder, natural casein isolate and nonfat dry milk. In general, dairy solids can be incorporated into the final product from about 0.5-35 wt. %.

This is beneficial because it means that less expensive dairy solids like non-fat dry milk can be substituted for some of the more expensive dairy components used to make the cheese curd without adversely affecting the quality of the final cheese product. It also means that the protein level of the final soft or firm/semi-hard ripened or unripened blended cheese product can be increased without significantly increasing the amount of fat that is present, thereby improving the nutritional qualities of the product.

If the dairy solid is included in the slurry, the concentration of the dairy solid in the slurry is generally adjusted such that the level of dairy solid in the final cheese product is at least about 0.5 wt. %, or about 5-33 wt. %, or about 9-28 wt. %, or about 11-24 wt. %. This means that the concentration of the dairy solid in the slurry itself is generally within the range of about 5-35 wt. %.

Starches. Incorporating starches into the heated slurry is beneficial because some starches need to be heated, hydrated and/or subjected to high shear conditions to become functional. Such conditions are required, for example, for some starches to become fully hydrated. This in turn allows the starch to thicken or gel and to bind to proteins in the cheese (e.g., casein). But starches can be added at other points along the process (e.g., the mixing stage). If a starch is incorporated into the final soft or firm/semi-hard ripened or unripened blended cheese product by including it in the heated slurry, starch concentrations of up to about 0.5, 12 or 26 wt. % can be achieved in the cheese. In some instances starch is at least 0.5 wt. %. Thus, the starch concentration can range from about 0.5-26 wt.% or from about 1-22 wt. % in the cheese. This means that the starch concentration in the slurry itself is typically about 0-35 wt. %.

A number of different types of starches can be incorporated into the final cheese product. Suitable starches include vegetable starches (e.g., potato starch, pea starch, and tapioca) and grain starches (e.g., corn starch, wheat starch, and rice starch). Specific examples of suitable corn starches include dent corn starch, waxy corn starch, and high amylose corn starch. The starches can be used individually or in combination. As noted above, starches can advantageously be included in the slurry. In some applications, the starch is added as a powder or unheated solution but, as explained above, at lower concentration levels.

The starch can be modified or native. Modified food starches differ in their degree of cross-linking, type of chemical substitution, oxidation level, degree of molecular scission, and ratio of amylose to amylopectin. Examples of some commercially available modified food starches that are suitable include Mira-Cleer 516, Pencling 200, Purity 660, Batterbind SC, Penbind 100, and MiraQuick MGL, Gel-N-Melt, Novation 3300. A suitable commercially-available native (unmodified) starch is Hylon V.

Mira-Cleer 516, from A. E. Staley Company, is a dent corn starch that is cross-linked and substituted with hydroxypropyl groups. The cross-linking increases its gelatinization temperature and acid tolerance. The hydroxypropyl substitution increases its water binding capability, viscosity and freeze-thaw stability. MiraQuick MGL, also from A. E. Staley Company, is an acid-thinned potato starch. The acid thinning breaks amylopectin branches in the starch, creating a firmer gel. Batterbind SC, from National Starch, is a cross-linked and oxidized dent corn starch. Purity 660, also from National Starch, is a cross-linked and hydroxypropyl substituted dent corn starch. Hylon V, also from National Starch, is an unmodified, high amylose corn starch.

Pencling 200, from Penwest Foods, is an oxidized potato starch. The oxidation increases its capacity to bind water and protein. Penbind 100, also from Penwest Foods, is a cross-linked potato starch.

Emulsifiers, Gelling Agents, Stabilizers and Thickeners. Gums, celluloses and alginates are some examples of emulsifiers, gelling agents, stabilizers and thickeners. Many of the considerations that apply to starches also apply to gums and celluloses. Certain gums, celluloses or alginates, for example, should be hydrated and/or heated to realize their full functional characteristics. Heating and hydration also enables increased levels of the gums and celluloses to be included in the final product. Some soft or firm/semi-hard blended cheeses that are provided herein contain at least about 0.01, 0.5, 3.0 or 6.0 wt. % gum, cellulose or alginate. The products thus generally have a gum or cellulose concentration of about 0.02-5.7 wt. %, about 0.04-4.75 wt. %, or about 0.5-20 wt. %. This means that the concentration of the gum or cellulose in the slurry itself is typically about 0.02-6.0 wt. % or 0.05-5.0 wt. %.

Different types of celluloses can also be incorporated into the cheese. The cellulose can be either natural or modified. One cellulose or combinations of different celluloses can be utilized. Types of celluloses that can be utilized include, but are not limited to, microcrystalline cellulose, powdered cellulose, methyl cellulose, propylene glycol alginate and sodium alginate. One specific example of a commercially available modified cellulose is METHOCEL A-15™ that is available from Dow Chemical Company (Midland, Mich.).

Examples of suitable gums that can be incorporated include, but are not limited to, xanthan gum, guar gum, konjac flour and locust bean gum. Examples of suitable stabilizers include chondrus extract (carrageenan), pectin, gelatin, and agar.

The total amount of gums and stabilizers included in the final cheese product is typically up to about 0.01, about 3, or about 6.0% by weight. More specifically, the amount of gums and/or stabilizers can range from about 0.02-5.75, from about 0.04-4.75%, or from about 0.1-3.5% by weight of the final cheese product. Gums and stabilizers concentrations in the slurry are typically in the range of about 0.02-6.0, or 0.5-5.0 wt. %.

Acidity Regulators, Anticaking Agents and Firming Agents. Acidity regulators, anticaking agents and firming agents of various types can be included in the soft or firm/semi-hard ripened or unripened blended cheese. Typically, these agents are inorganic salts, but other types of acidity regulators, anticaking agents and firming agents can also be used. Examples of suitable acidity regulators, anticaking agents and firming agents may include calcium chloride, tricalcium phosphate, and calcium hydroxide, powdered cellulose, disodium phosphate and potassium hydroxide. These agents are typically added as part of a solution, either by incorporation in the slurry or as a liquid. But they can also be added as a powder that is incorporated, for example, into the admixture of the slurry and heated cheese mass at the mixing stage.

The total amount of acidity regulators, anticaking agents and firming agents incorporated into a slurry is sufficient so the concentration of the acidity regulators, anticaking agents and firming agents in the final cheese product is generally up to about 0.01, 0.5, or 3.0% by weight. More specifically, the amount of acidity regulators, anticaking agents and firming agents can range from about 0.05-3.0%, from about 0.1-2.5%, or from about 0.5-2.0% by weight. This means that the concentration of the acidity regulators, anticaking agents and firming agents in the slurry is typically about 0.01-3.2 wt. %.

Sequestrants. A number of different sequestrants can be incorporated into the final cheese product. Sequestrants that can be utilized include, but are not limited to, various phosphate salts (e.g., sodium hexametaphosphate, monosodium phosphate, sodium tripolyphosphate, disodium phosphate, and potassium phosphate), calcium citrate, trisodium citrate, calcium gluconate, oxystearin and sorbitol.

The total amount of sequestrant is usually up to about 0.1, 1, or 4% by weight of the final cheese product. So, for example, the amount of sequestrant in the final cheese product can range from about 0.1 to 4%, from about 0.25 to 3.0%, or from about 0.4 to 2.5% by weight. The concentration of the sequestrants in the slurry itself is typically about 0.1 to about 12% by weight of the slurry.

Acidic agents. An acidic agent (an acid) can be incorporated to adjust the pH of the finished cheese to a desired level. The acidity of the cheese can be controlled to help regulate the melt down characteristics of the finished cheese. Various acids can be employed; examples of suitable acids include, but are not limited to, adipic acid, lactic acid, hydrochloric acid, acetic acid, glucano delta lactone, phosphoric acid, lactobionic acid or Genlac C, the latter being a blend of water, citric acid, lactic acid, acetic acid and artificial flavors. Acid is typically added to adjust the pH of the finished cheese to a pH from about 5-6 is reached, and more typically from pH 5.10-5.90.

Whether the acidic agents are introduced into the final soft or firm/semi-hard ripened or unripened blended cheese product via the slurry or during the mixing stage, the acid agent is added in an amount such that the pH range of the final product falls within the foregoing ranges. If included in the slurry, the acid agent is included in an amount sufficient to adjust the pH of the slurry within the range of about 1.0-7.0.

Cheese powders. Cheese powders can also be mixed into the soft or firm/semi-hard ripened or unripened blended cheese to impart a different cheese flavor to the finished product. Such powders are typically added to the heated cheese mass as a powder, rather than as part of the slurry.

Examples of suitable cheese powders include, but are not limited to, Parmesan, cheddar, Monterey Jack, Romano, muenster, Swiss, and provolone powders. The amount of cheese powder in the finished cheese is generally about 0.25 to 10%, and in some instances about 0.25 to 1% by weight. Cheese powders are available from a variety of commercial suppliers, including, for example, Armour Foods of Springfield, Ky.

Colorants. A colorant can be incorporated into the soft or firm/semi-hard ripened or unripened blended cheese to adjust its natural color. This can be useful, for example, if consumers have a preference for a color other than the naturally-occurring color. Examples of suitable colorants include annatto, tumeric, titanium dioxide, and beta-carotene. Colorants may be of both the natural or artificial color. If one wished to color the cheese a red, an artificial color such as FD&C red # 40 can be used. Annatto is useful to give mozzarella cheese the appearance of cheddar. This allows one to produce a cheese for pizza baking that has the desired melt characteristics of mozzarella, but with a different appearance than that of traditional white mozzarella. Annatto-colored mozzarella can be used as a replacement for cheddar cheese in many food products (e.g., Mexican-style prepared foods). Tumeric imparts a yellowish color to cheese. The yellowish color often is preferred by consumers who perceive it to indicate a "richer" product upon cooking on a pizza. Colorants such as annatto and tumeric can be obtained, for example, from Chris Hansens Labs of Milwaukee, Wis.

Colorants can be incorporated into the final soft or firm/semi-hard ripened or unripened blended cheese product by inclusion in the slurry. If added at the mixing stage, the colorant is generally sprayed onto the heated cheese mass as an unheated solution or dispersion in water. The amount of colorant added is typically in the range of about 0.01 to 2%, based on the weight of the finished cheese. Tumeric, if used, is generally added in an amount of about 0.05 to 0.5%. If annatto is added, it normally is added to about 0.1 to 0.9% by weight.

Flavoring Agents. Various flavoring agents can also be incorporated into the cheese to tailor the flavor profile of the cheese to meet consumer preferences. Suitable flavors for mixing into the heated cheese include, for example, cheddar cheese flavor and parmesan cheese flavor.

Flavoring agents can be incorporated into the final soft or firm/semi-hard ripened or unripened blended cheese product by incorporation into the heated slurry or by addition to the heated cheese mass as a dry powder, or more typically as part of an unheated aqueous solution. Flavoring agents are typically added in an amount such that the concentration in the final cheese product is within the range of about 0.01 to 5 wt. %. If incorporated into the slurry, the concentration of the flavoring agent in the slurry is generally is in the range of about 0.11-4.50 wt. %.

Non-dairy protein isolate. A non-dairy protein isolate can also be incorporated into the soft or firm/semi-hard ripened or unripened blended cheese. It is to alter the texture of the cheese and/or to change the size, color, or integrity of the blisters that are formed when the cheese is baked on a pizza, as well as other cook characteristics. Examples of suitable non-dairy protein isolates include, but are not limited to, soy protein (sometimes called "soy powder"), gelatin, wheat germ, corn germ, gluten, and egg solids.

If incorporated into the final soft or firm/semi-hard ripened or unripened blended cheese product via the slurry, the protein isolate is added to a concentration such that the concentration of the protein isolate in the final cheese product is up to about 5, 20 or 35 wt. %. The concentration of the protein isolate in the slurry is thus adjusted such that the concentration of the protein isolate is about 5-33, or about 9.5-28.5% by weight of the final cheese product.

Salt. Salts of various types, but typically sodium chloride, can be added to tailor the flavor of the final cheese. The salt can be incorporated into the final soft or firm/semi-hard ripened or unripened blended cheese product by including it in the heated slurry or by adding it in granular form or as an unheated solution to the heated cheese mass. Regardless of how introduced, the salt concentration in the final cheese product is usually added at a level of about 0.1 to 5 percent, based on the weight of the finished cheese. When added as an ingredient of the slurry, this means that the salt concentration in the slurry is generally about 0.1-5.0 wt. %.

Antifoaming Agents. Various antifoaming agents can be incorporated to facilitate processing. Examples include, but are not limited to, microcrystalline wax, oxystearin and polydimethylsiloxane.

Carbohydrates. A variety of simple sugars (e.g., mono- and disaccharides), as well as more complex carbohydrates can be included in the cheese. Examples include, but are not limited to, glucose, sucrose, and fructose.

Enzymes. Enzymes. Enzymes may be used to create flavors, texture, melt, and/or other functional characteristics in the final cheese product, and/or in the slurry that can then be transferred to the final cheese product once the slurry and cheese have been mixed together. Examples of such enzymes, and this is not an all inclusive list, would be lipases, proteases, oxidoreductases, and transglutaminase.

Neutraceuticals. Neutraceuticals may be included to deliver nutrients not normally present in cheese. Examples of neutraceuticals include, but are not limited to lycopene, antioxidants, probiotics, prebiotics, phosphatidylserine, vegetable sterols, immunoglobulins. These products in particular may be added as part of the slurry or to the mixer.

V. Slurries

Compositions in the form of slurries that contain the basic ingredients to make an analog cheese and one or more additional ingredients such as those listed in the preceding section are also provided. The slurries utilized to prepare the soft or firm/semi-hard ripened or unripened blended cheeses typically are water, fat and/or oil-based compositions. For example, water in these compositions typically accounts for from about 25-65% of the slurry by weight. Additionally oil in these slurry compositions may account for from about 25-65% of the slurry by weight. Because the slurry contains the basic ingredients for making an analog cheese, it typically contains water, a protein (e.g., a casein), an oil or fat, and a sequestrant. But the slurry can also include one or more of the ingredients in the concentration ranges listed in the preceding section, for example.

Figure 2A:
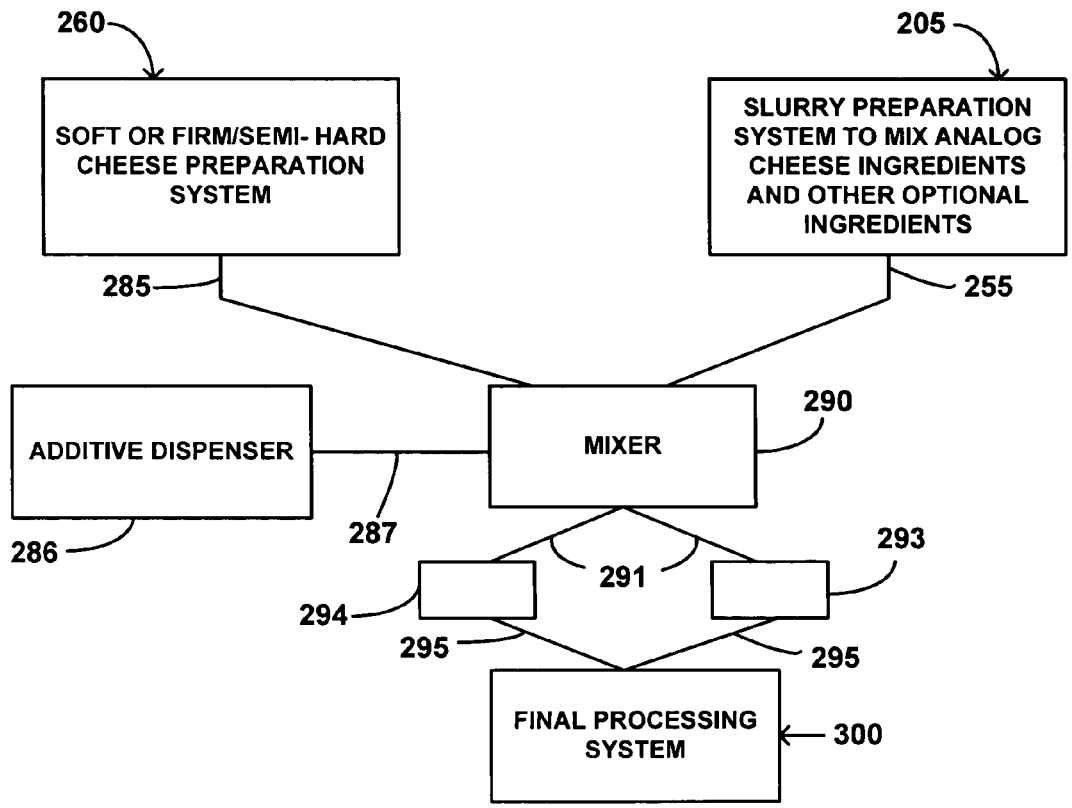
FIGS. 2A-2C depict different exemplary systems that can be utilized to carry out some of the cheese processing methods that are disclosed herein.

VI. Exemplary Systems for Preparing Soft or Firm/Semi-Hard Ripened or Unripened Blended Cheeses FIG. 2A depicts one example of a generalized system that can be used to carry out the foregoing methods to prepare the soft or firm/semi-hard ripened or unripened blended cheeses that are described herein. As this figure illustrates, one system design 200 involves the following basic subsystems: (1) a slurry preparation system 205, (2) a soft or firm/semi-hard cheese preparation system 260, (3) mixer 290, (4) optional ingredient dispenser 286, and (5) a final processing system 300.

In exemplary system 200, slurry preparation system 205 is used to prepare the slurry that contains the basic ingredients to formulate the analog cheese, as well as any other optional ingredients. As the name implies, the soft or firm/semi-hard cheese preparation system 260 is the system utilized to prepare the heated mass of soft or semi-soft cheese. Systems 205, 260 are both in communication with mixer 290 via transfer tubes 255 and 285, respectively. Once the analog cheese slurry and heated cheese mass have been transferred to mixer 290, these two major cheese components are thoroughly mixed together in mixer 290 to form the admixture.

The system shown in FIG. 2A also shows an ingredient dispenser 286 in communication with mixer 290 via connector 287. Some systems, however, do not include this unit. The admixture formed by the mixing of the slurry, heated cheese mass and optional ingredients is then transferred to final processing system 300 via transfer tube 295. Alternatively, the transfer tube 291 may divert the flow of the admixture between coloring units 293 and 294. Coloring unit 293 may add coloring (e.g., orange coloring) to the admixture to give it the appearance of, for example, cheddar cheese, while coloring unit 294 may add no color and leave the cheese substantially white in color. The entire admixture may be diverted through one or the other coloring units 293 and 294, as well as being adjustable to split the admixture between the coloring units to create, for example, a cheese combination from the admixture. In the final processing system 300, the admixture resulting from the mixing of the analog slurry, heated cheese mass and optional ingredients is shaped and cooled to form the final soft or firm/semi-hard ripened or unripened blended cheese product.

A wide variety of different systems as described herein have this general design. Although specific examples of such systems are described below, it should be understood that these systems are only examples and not intended to be an exhaustive list of the types of systems that can be used to carry out the cheese processing methods that are described herein or of the type of systems that can be used to prepare the type of soft or firm/semi-hard ripened or unripened blended cheeses that are disclosed herein.

Figure 2B:
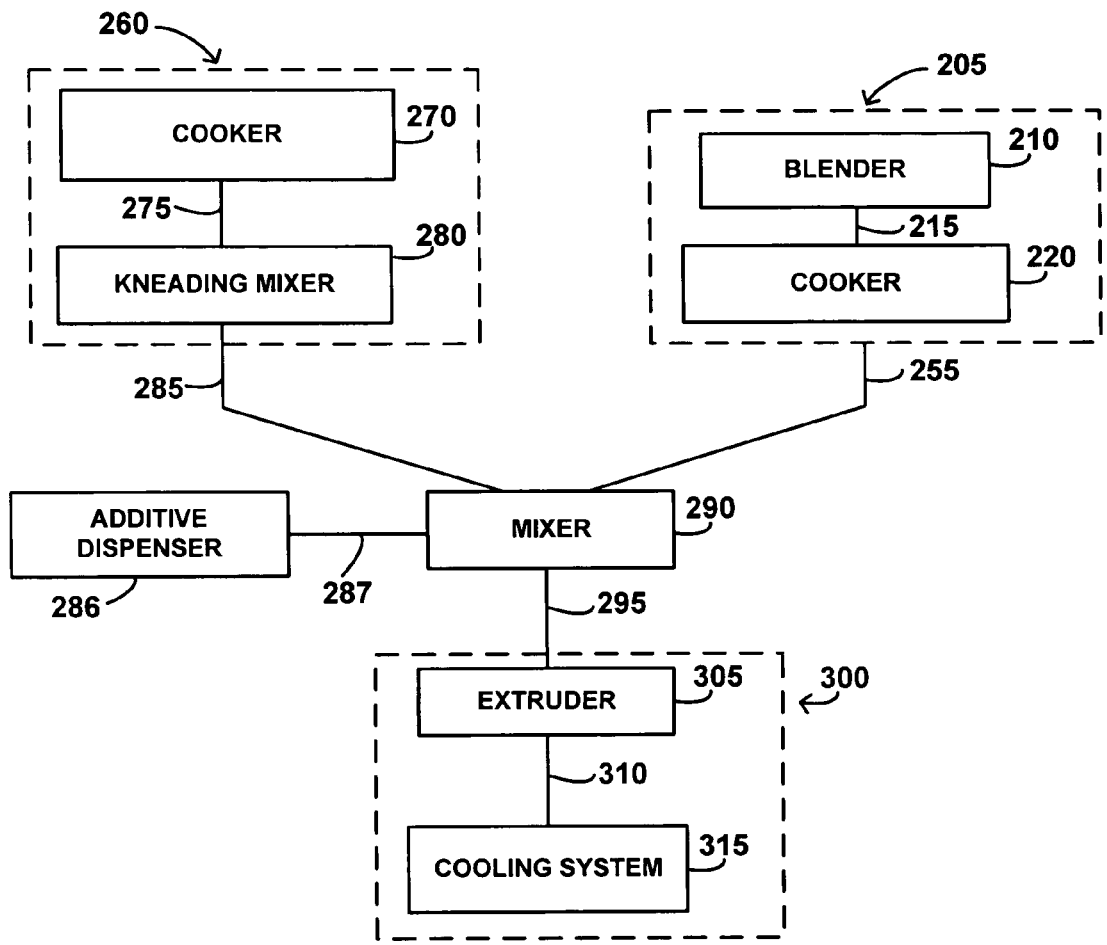

One exemplary system that can be used to perform the methods that are disclosed herein is shown in FIG. 2B. In this particular system 201, slurry preparation system 205 includes a blender 210 and cooker 220 that are connected to one another via transfer tube 215. The necessary ingredients for making the analog cheese and any other optional ingredients are introduced into blender 210, where they are blended together to form an initial slurry. This resulting slurry can then be transported into cooker 220, where the slurry is heated to form a heated slurry.

The soft or firm/semi-hard cheese preparation system 260 in this particular system 201 may include cooker 270 and a kneading mixer 280 that are joined by transfer tube 275. Although cooker 270 and kneading mixer 280 are shown as separate units in this particular system, they can optionally be part of the same unit (i.e., as a mixer/cooker) in other systems.

Mixer 290 is connected to slurry preparation system 205 and soft or semi-soft unripened or unripened cheese preparation system 260 by transfer tubes 255 and 285, respectively. Mixer 290 is the location at which the slurry and heated cheese mass are mixed together to form an admixture. Mixer 290 is connected to final processing system 300 by transfer tube 295.

The final processing system 300 in this particular system includes extruder 305 and a separate cooling system 315 that are connected by transfer tube 310. But in other systems, extruder 305 and cooling system 315 are integrated together as part of a single system. In the particular arrangement depicted in FIG. 2B, the admixture formed in mixer 290 is discharged to extruder 305 via transfer tube 295, which connects these two units. As the admixture is forced through extruder 305 into a desired shape it is cooled in cooling system 315.

Figure 2C:
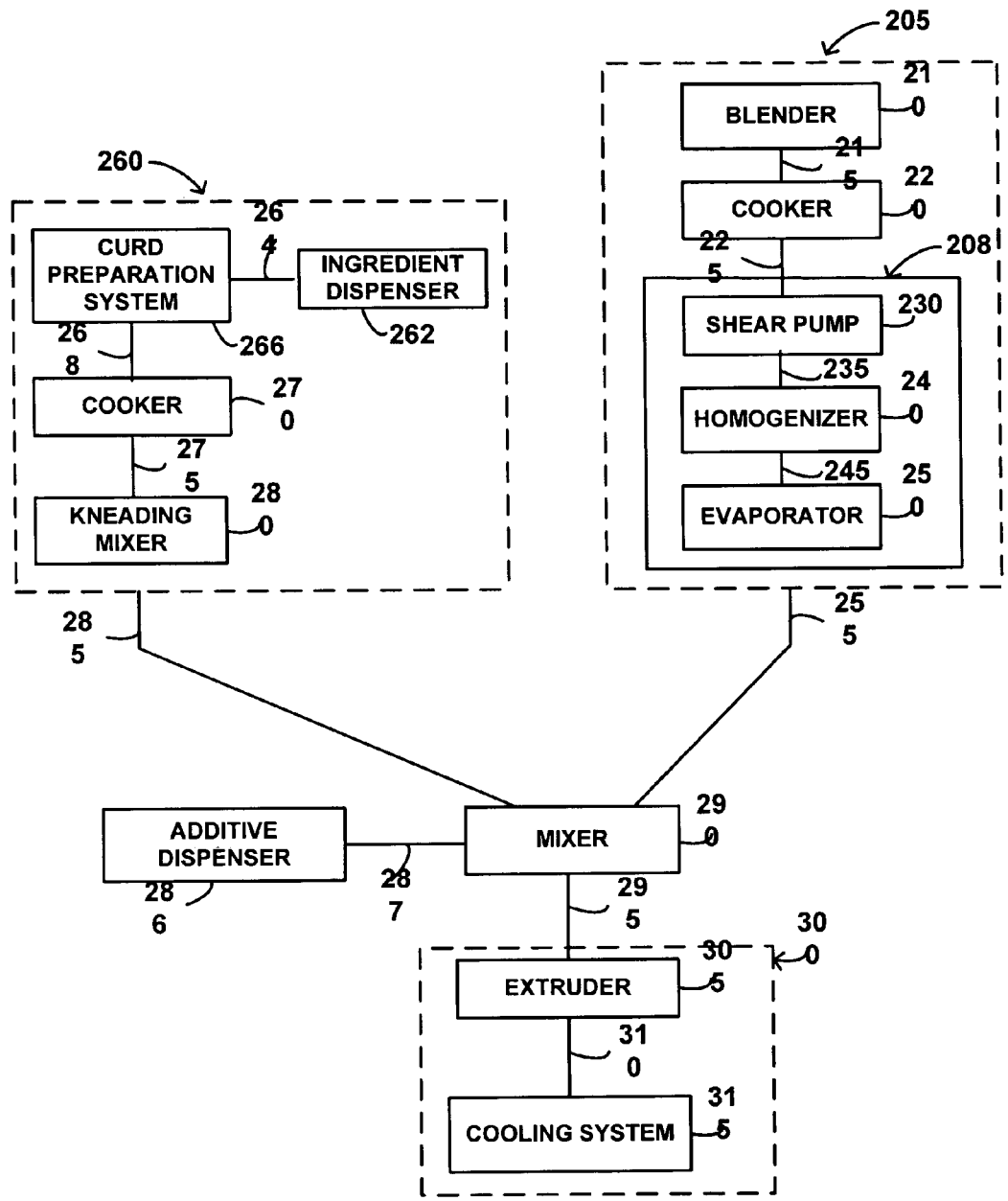

Another exemplary system 202 is shown in FIG. 2C. The soft or firm/semi-hard cheese preparation system 260 in this particular system includes curd preparation system 266 and ingredient dispenser 262. This thus allows ingredients to optionally be added from dispenser 262 via transfer tube 264 during the preparation of a soft or firm/semi-hard cheese curd. The ingredients can thus be added, for example, to the cheese curd ingredients (e.g., milk, cream and/or starter (i.e., bacterial cultures used in curd preparation)), mixtures of such ingredients (e.g., silo—i.e., a mixture of pasteurized milk, cream and starter), coagulum and the cheese curd itself. Incorporation can be achieved using standard mixing and grinding apparatus.

The slurry preparation unit 205 in system 202 also includes additional optional components to shear, homogenize and/or adjust the water content of the slurry that is prepared. More specifically, slurry preparation system 205 in this system includes slurry mixing and moisture control subsystem 208. The particular subsystem 208 shown in FIG. 2C includes shear pump 230, homogenizer 240 and evaporator 250. Subsystem 208 is in communication with cooker 220 and mixer 290.

In the particular subsystem shown in FIG. 2C, shear pump 230 of subsystem 208 is connected to cooker 220 via transfer tube 225 to establish a link between the cooker and the subsystem. Shear pump 230 is also connected to homogenizer 240 by transfer tube 235, with homogenizer 240 in turn connected to evaporator 250 by transfer tube 245. Evaporator 250 is connected to mixer 290 by transfer tub 255, thus establishing the connection between subsystem 208 and mixer 290.

Thus, heated slurry from cooker 220 can flow into shear pump 230 via transfer tube 225, where the slurry is subjected to the shear conditions described above. The sheared slurry can subsequently be transferred to homogenizer 240 through transfer tube 235, where the slurry and the ingredient(s) it contains are homogenized. The resulting homogenized slurry can then flow through transfer tube 245 into evaporator 250. Evaporator 250 adjusts the moisture content within the ranges listed above. The final slurry then flows from evaporator 250 into mixer 290 via transfer tube 255.

The heated slurry from slurry preparation system 205 can then be mixed with the heated cheese mass from preparation system 260 in mixer 290. Ingredients can optionally be introduced into mixer 290 as well from ingredient dispenser 286. The admixture formed in mixer 290 can then be processed (e.g., extruded and cooled) in final processing system 300.

It will be appreciated by those of ordinary skill in the art that certain units within slurry preparation system 205 (e.g., cooker 220, shear pump 230, homogenizer 240 and evaporator 250) can be arranged in a variety of other configurations. For instance, although shown as separate units in FIG. 2C, shear pump 230 and homogenizer 240 can be part of a single unit in other systems. Other combinations that can optionally be utilized in still other systems are those in which cooker 220 and shear pump 230 are part of the same unit, and systems in which cooker 220, shear pump 230 and homogenizer 240 are all part of the same integrated unit.

The order in which cooker 220, shear pump 230 and homogenizer 240 appear in FIG. 2C can also be altered in other systems such that all the various permutations are possible. Examples of optional arrangements that can be utilized in other systems include: 1) cooker-homogenizer-shear pump, 2) shear pump-homogenizer-cooker, 3) shear pump-cooker-homogenizer, 4) homogenizer-shear pump-cooker, 5) homogenizer-cooker-shear pump, and the other various permutations.

It should also be recognized that shear pump 230, homogenizer 240 and evaporator 250 are optional components in the slurry preparation system 205 (see, e.g., the system described in FIG. 2B).

Final processing system 300 in cheese preparation system 202 is as described with respect to system 201 shown in FIG. 2B.

The specific design of the final processing system can vary, but can include a pre-brine tank that includes super cold sodium chloride brine into which molten cheese or cheese ribbons can flow. A cutter can cut the cheese into loaves as the cheese ribbon exits the pre-brine tank. The cooled and salted loaves are then transferred to a main brine tank where they stay until removed by a conveyor. An exemplary system of this general design is described in U.S. Pat. No. 5,902,625, which is incorporated herein by reference in its entirety for all purposes.

Different types of blenders can be used to mix the ingredients together to form the initial slurry. In general, the blender simply needs to be capable of mixing relatively viscous materials. One common blender is a twin-screw mixer or extruder such as is common in the food industry. Another option involves adding the various analog cheese ingredients along a ribbon blender, with the ingredients becoming mixed in mixers positioned along the ribbon. Yet another option is to simply pass the slurry along a pipeline through a series of pumps and static mixers.

The cooker used in these systems can be of various types, including lay-down cooker, swept surface heat exchanger, pipeline cooker with continuous mixing. The cookers are capable of heating a slurry of the compositions defined herein to temperatures ranging from about 90-293° F. Specific examples of suitable cookers include the RotaTherm™ cooker available from Gold Peg International Pty. Ltd. (Moorabbin, Vic, Australia), the FusionCooker™, available from Blentech Corporation, (Rohnert Part, Calif.), the continuous mixer from READCO Manufacturing (York, Pa.), or single or Evolum 145 twin screw extruders from Clextral Inc. (Tampa, Fla.). The cookers can heat the slurry by convection (e.g., a heated blanket surrounds the cooker) or by directly injection steam into the cooker, or combinations of direct/indirect and mechanical heating and or radiation heating such as microwaves.

Various types of shear pumps can be utilized. Suitable types of shear pumps include inline mixers, colloid mills. Examples of pumps that can be used include Silverson Inline mixer (East Longmeadow, Mass.) and Stephan cooker (Stephan Machinery Corp, Columbus, Ohio) or a colloid mill supplied by Waukesha Cherry Burrell (Charlotte, N.C.) The shear pump should be capable of generating shear forces of at least $10,000\ s^{-1}$ to $500,000\ s^{-1}$.

A number of homogenizers are also suitable for use in the systems that are provided. Examples of homogenizers that can be used include those manufactured by APV Gaulin (Kansas City, Mo.) and Waukesha Cherry Burrell (Charlotte, N.C.).

Evaporators of different types can also be utilized. In general, the evaporator should be able to handle relatively viscous solution. Flash vacuum vessels are one example of a suitable evaporator. Evaporators of this type are available from Invensys APV (Lake Mills, Wis.) or De Dietrich Process Systems (Bridgeton, Mo.). Some systems include a feedback system that is connected to the evaporator (e.g., a near infrared monitor). This system may include a sensor that can monitor the moisture level in the slurry coming from the evaporator and send a signal to the evaporator signaling the evaporator to increase, decrease or maintain the level at which water is removed from the slurry so the desired moisture content in the slurry is achieved.

A number of different kneading mixers can be used to heat and knead the cheese curd into the heated cheese mass. One exemplary device for performing this operation is a single or twin-screw mixer or a twin-screw extruder, either fitted for steam injection or having a heated jacket, or a combination of both. When using a twin-screw mixer or extruder to perform the heating and kneading, the screws (i.e., augers) are typically arranged so they overlap, to insure thorough mixing.

VII. Soft or Firm/Semi-Hard Ripened or Unripened Blended Cheeses

As noted above, some of the methods that are disclosed herein can be utilized to manufacture analog/soft or firm/semi-hard cheese blends that contain ingredients that previously have not been included in cheese products manufactured using conventional methods because the ingredients require heating and/or hydration to become functionalized (activated). Soft or firm/semi-hard ripened or unripened blended cheeses containing relatively high concentrations of certain ingredients can also be prepared using methods disclosed herein as compared to other processing techniques. So, for instance, some of the cheeses that are provided have one, two, three or more of the following characteristics. Some of the soft or firm/semi-hard ripened or unripened blended cheeses have one or more ingredients such as starch, a dairy solid, gum, a stabilizer, and cellulose.

The soft or firm/semi-hard ripened or unripened blended cheeses that are provided typically have a protein content of about 5-40 wt. %, a moisture content of about 35-65%, and a fat content of about 0-60% on a dry basis (FDB). The actual composition varies somewhat depending upon the particular type of soft or firm/semi-hard blended cheese that is to be produced.

The cheeses that are provided can be in a variety of different forms including loaves, Ribbons™, comminuted forms (e.g., diced or shredded forms) and other forms known in the art. The pH of the cheese generally ranges from about 5.00 to about 6.00, such as about 5.10 to about 5.90.

VIII. Food Products and Methods of Manufacturing Such Food Stuffs

The analog/soft or semi-soft cheese blends that are provided can be utilized in essentially baking application that involves the use of cheese and can be incorporated into a wide variety of food products. The blended cheesesoft or firm/semi-hard ripened or unripened blended cheeses, for instance, can be included as an ingredient in a variety of convenience foods, including entrees, snack foods and appetizers.

The term "food product" is intended to broadly encompass any type of food to which one can add cheese. Examples of suitable types of foods into which the provided cheeses can be added, include, but are not limited to: cereal-based products; poultry, beef, pork or seafood-based entrees; potatoes; vegetables; fruit; candy; and nuts. The cereal-based products can be of diverse types including, for instance, pizzas, burritos, dough-enrobed sandwiches, hand-held foods, breads, bagels, pastries, and grain-based snack foods (e.g., crackers and pretzels). The cheese can be included with a variety of different forms of potatoes, including, chips, French fries, hash browns, and strings. Likewise, vegetables of various types can be combined with the cheeses that are provided. Exemplary vegetables include, mushrooms, zucchini, peppers (e.g., jalapenos) and cauliflower.

The soft or firm/semi-hard ripened or unripened blended cheeses can be incorporated into the food product, layered onto or in the food product or used as a coating. One common use, for example, is as an exposed cheese on a pizza or as the string cheese rolled in the outer lip of a pizza crust (a so-called "stuffed crust pizza").

As those skilled in the art will recognize, the foregoing list is simply illustrative and is not intended to be an exhaustive list of the types of foods that can be combined with the soft or firm/semi-hard ripened or unripened blended cheeses that are provided herein.

The cheeses that are provided are suitable for use in essentially any type of cooking including convection heating, steam injection heating and microwave heating, for example. In some microwave heating applications, for example, the food product is exposed to microwave energy in an amount and for a duration sufficient to heat and melt the cheese, whereby the cheese melts to form a uniform mass of cheese. The cheeses can generally be heated in a variety of microwaves, such as microwaves having wattages of 400-1000 watts, or full power microwave ovens of 650-850 watts that are common home microwave ovens. The cheeses can be cooked over a range of cooking times such as from 0.5 to 20 minutes, or 0.5-10 minutes, or 2-5 minutes, which are the typical microwave cook times used to prepare frozen or refrigerated entrees and appetizers.

The cheese blends that are disclosed herein can be combined with food product such as those just listed using any of a variety of methods. For example, the food product can be dipped in melted cheese. Alternatively, the soft or firm/semi-hard ripened or unripened blended cheese can be sprinkled or layered onto the food product using conventional food processing equipment. In such processes, the soft or firm/semi-hard ripened or unripened blended cheese is typically first comminuted to form relatively small pieces of cheese or shredded cheese. Once the soft or firm/semi-hard ripened or unripened blended cheese has been combined with the food product, the resulting food product can optionally be refrigerated or frozen for future sale or use.

EXAMPLES

Blended cheese was made in three different ways. In the first method, (Example A), a traditional imitation cheese blend, composed of 50% imitation and 50% Mozzarella, was made by combining cheese curd, caseins, imitation fat and emulsifying salts heated to greater than 150° F. (65.6° C.). The resultant product had composition targets of 50.50% moisture, 47 FDB, 5.70 pH, and 1.60% salt. This product served as a control. In the second method, (Example B) a novel imitation cheese blend, composed of 50% imitation and 50% mozzarella, was made by separately manufacturing Mozzarella and heating to less than 150° F. (65.6° C.), separately manufacturing imitation cheese by combining caseins, imitation fat and emulsifying salts and heating to greater than 150° F. (65.6° C.), and combining the two separate components at less than 150° F. (65.6° C.). The resultant product had final component targets of 50.5% moisture, 47 FDB, 5.70 pH and 1.60% salt. In third method, (Example C) 50% of milk fat in real mozzarella cheese was replaced by vegetable oil. The vegetable fat was mixed with water, nonfat milk powder and emulsifying salts separately and heated to greater than 150° F. (65.6° C.), and added to mozzarella cheese made separately by heating to less than 150° F. (65.6° C.) in such a ratio so that the final product had 50% vegetable oil and 50% milk fat. The target composition for the final product was also 50.5% moisture, 47 FDB, 5.70 pH, and 1.60% salt. Table 1 describes the compositions of the 50/50 imitation/mozzarella cheese blend (Examples B), and the blended cheese with 50% butterfat replaced by vegetable oil (Example C). The gluconic acid is added to the slurry as a processing aid to cause a reduction in slurry viscosity before cooking, making the slurry easier to pump through the cooker and other system equipment.

TABLE 1

Blended Cheese or Blended Slurry Composition

| Treatment | % Palm Oil | % Sodium Alum. Phos. | % Rennet Casein | % Acid Casein | % Sodium Casein | % Water | % NDM | % Tricalcium Phosphate | % GdL | % Starch | Tri-sodium Citrate | % Salt | Tri-sodium Phos. |
|---|---|---|---|---|---|---|---|---|---|---|---|---|---|
| Example b. Cheese blend composed of 50% imitation and 50% Mozzarella | 24.60 | 0.82 | 11.82 | 7.75 | 7.09 | 40.81 | 0 | 0 | 0 | 4.50 | 0.20 | 2.20 | 0.20 |

TABLE 1-continued

Blended Cheese or Blended Slurry Composition

| Treatment | % Palm Oil | % Sodium Alum. Phos. | % Rennet Casein | % Acid Casein | % Sodium Casein | % Water | % NDM | % Tricalcium Phosphate | % GdL | % Starch | Tri-sodium Citrate | % Salt | Tri-sodium Phos. |
|---|---|---|---|---|---|---|---|---|---|---|---|---|---|
| Example c. Blended Cheese with 50% butterfat replaced by vegetable oil | 35.0 | 0 | 0 | 0 | 0 | 32.78 | 22.2 | 0.25 | 1.22 | 5.5 | 0 | 0 | 0 |

All three-cheese samples were stored at 35° F. (1.7° C.) for 14 days and then shredded on an Urchell CC shredder (Urchell Laboratories, Inc., Indiana, USA) (1¼" to 3"×0.20"×0.095"), frozen individually and stored in the cooler at −20° F. Two-pound samples of cheese were removed and stored in the cooler at 35° F. (1.7° C.) and melted on two different types of pizza. The cheese was melted on a conveyor-bake pizza (Middleby Marshall oven at 420° F. (215.6° C.) for 6 min 30 sec) composed of 7-oz of cheese on a regular pizza crust together with 4-oz of pizza sauce. The cheese was also melted on a frozen pizza composed of 5.6-oz of frozen cheese placed on a ready-made crust and 3-oz of sauce and frozen for future melts. When ready to evaluate, the pizza was cooked in a home oven at 425° F. for 19 min.

The shred cut qualities and melt grades of the cheeses produced in the examples were then measured. The melt grade measurements of the cheeses on the service oven pizzas and cooked frozen pizzas included comparisons of the blister color, blister %, blister size, melt, stretch, and oiling-off. The melt grade measurements were made with a 20-point scale, with 10 being the best grade, while 1 is too little, and 20 is too much. Table 2 summarizes the melt grade grading system:

TABLE 2

Melt Grade Grading System

| | NONE | SLIGHT | MODERATE | DEFINITE | PRONOUNCED |
|---|---|---|---|---|---|
| Score | 1 to 4 | 5 to 8 | 8 to 12 | 12 to 16 | 16 to 20 |
| Blister % | 0-10% | 10-25% | 25-50% | 50-75% | >75% |
| Blister Size | ⅛ to ¼' | ⅜ to ½' | ⅝ to ¾' | ⅞ to 1' | >1' |
| Blister Color | Light Golden | Golden to Light Golden | Brown | Dark Brown | Black |
| Oiling Off | None | Even sheen over cheese surface | Some minor areas with slight pooling | Noticeable collection areas | Entire surface heavily coated with oil |
| Meltdown | Cheese does not fuse together after cooking | Appears fused together but shows minor jigsaw appearance | Cheese completely fused together | Cheese is slightly soupy and sauce appears to bleed through | Cheese is very runny, soupy and appears weak in body |
| Stretch | 0 to 1' | 1½ to 3' | 3 to 5' | 5 to 7' | >7' |

The shred quality measurements of the cheeses included comparisons of shred quality and shred compaction. These measurements were made on a 4-point scale with 1 being the best, and 4 being the least acceptable. Table 3 summarizes the results of the melt grade and shred quality measurements for Examples A-C:

TABLE 3

Shred Quality and Melt Grades

| | Food Service Pizza | | | | | | Frozen Pizza | | | Cut Quality | |
|---|---|---|---|---|---|---|---|---|---|---|---|
| | Blister % | Blister Size | Blister Color | Oiling Off | Melt | Stretch | Blistering | Melt | Stretch | Compaction | Shred Quality |
| Example a. Traditional Imitation cheese blend (control) | 9 | 5 | 8 | 7 | 16 | 3 | 6 | 14 | 4 | 2.5 | 4.0 |
| Example b. Novel imitation cheese blend composed of 50% imitation and 50% Mozzarella | 14 | 7 | 10 | 3 | 11 | 8 | 5 | 8 | 8 | 1.5 | 1.5 |

TABLE 3-continued

Shred Quality and Melt Grades

| | Food Service Pizza | | | | | | Frozen Pizza | | | Cut Quality | |
| --- | --- | --- | --- | --- | --- | --- | --- | --- | --- | --- | --- |
| | Blister % | Blister Size | Blister Color | Oiling Off | Melt | Stretch | Blistering | Melt | Stretch | Compaction | Shred Quality |
| Example c. BlendedCheese with 50% butterfat replaced by vegetable oil | 8 | 3 | 14 | 1 | 10 | 10 | 12 | 9 | 7 | 2.0 | 2.0 |

Table 3 shows that cheese made in Examples B and C are superior in functionality on both types of pizzas as compared to control imitation cheese blend (Example A). The trial cheese, when melted on a pizza, had desirable melt and significantly better stretch than the control imitation cheese blend. On a pizza, the control imitation cheese blend was over-melted, thin and soupy, and had very short and weak stretch. Shredded trial samples (Examples B and C) were also significantly superior to the traditional imitation cheese blend (Example A). These test cheese blends have superior intact shred quality, very little fines and excellent handling qualities. The control sample was also very sticky and compacted easily. This is very important for pizzerias that buy shredded cheese and use cups to dispense the required amount on cheese on a particular pizza. A cheese with significant fines and severe compaction defects, such as Example A, would result in poor portion control and poor cheese distribution on a pizza.

Figure 3A:
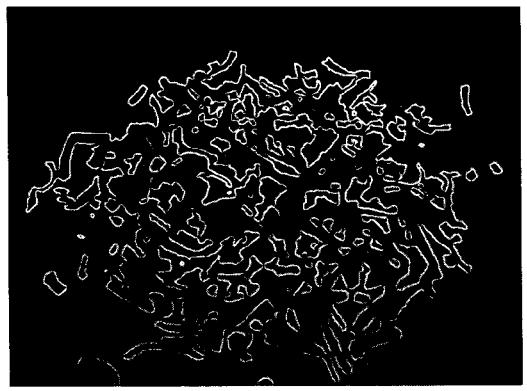
FIGS. 3A-C show examples of shredded cheeses.
Figure 3B:
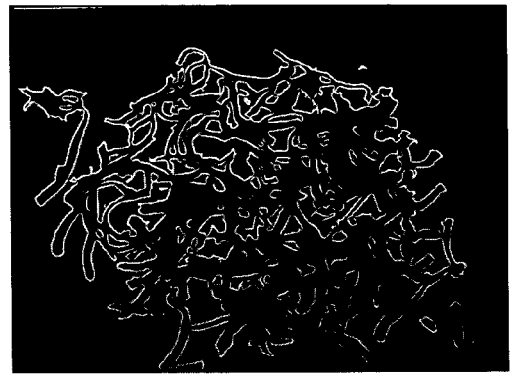
Figure 3C:
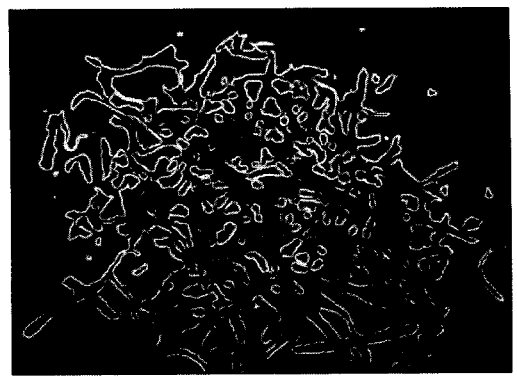

FIGS. 3A-C show examples of shredded cheeses. Shredded trial samples (FIGS. 3B and 3C) were significantly superior to the traditional imitation cheese blend (FIG. 3A). These test cheese blends have superior intact shred quality, very little fines, and excellent handling qualities. The control sample was also very sticky and compacted easily. This is a sought after quality for shredded cheese used by pizzerias that use cups to dispense a predetermined amount of cheese on a particular pizza. A cheese with significant fines and severe compaction defects, such as the shredded cheese shown in FIG. 3A, would result n poor portion control and poor cheese distribution on a pizza.

It is understood that the examples and embodiments described herein are for illustrative purposes only and that various modifications or changes in light thereof will be suggested to persons skilled in the art and are to be included within the spirit and purview of this application and scope of the appended claims. The cheeses of the present invention may be made by the methods described herein, or by any other method that produces a finished cheese product having the same physical or chemical properties as the present cheeses. All publications, patents and patent applications cited herein are hereby incorporated by reference in their entirety for all purposes to the same extent as if each individual publication, patent or patent application were specifically and individually indicated to be so incorporated by reference.

What is claimed is:

1. A method for preparing a cheese, comprising:
   (a) providing a slurry that comprises a plurality of analog cheese ingredients;
   (b) separately preparing a heated cheese mass;
   (c) mixing the slurry with the cheese mass to form an admixture; and
   (d) shaping and cooling the admixture to form the cheese.

2. The method of claim 1, wherein the plurality of analog cheese ingredients are selected from the group consisting of water, a fat, a casein, a sequestrant, a starch, a salt, an acid, a flavoring agent and a vegetable oil.

3. The method of claim 2, wherein the plurality of analog cheese ingredients are water, casein, a vegetable oil and a sequestrant.

4. The method of claim 1, further comprising heating the slurry.

5. The method of claim 4, further comprising processing the slurry by performing one or more processes selected from the group consisting of subjecting the slurry to high shear conditions, homogenizing the slurry and adjusting the water content of the slurry before the slurry is mixed with the heated cheese mass.

6. The method of claim 5, wherein processing comprises subjecting the slurry to high shear conditions, homogenizing the slurry and adjusting the water content of the slurry to 35-65 wt. % before mixing the slurry and the heated cheese mass.

7. The method of claim 5, wherein processing comprises subjecting the slurry to high shear conditions, homogenizing the slurry and adjusting the water content of the slurry to 25-65 wt. % before mixing the slurry and the heated cheese mass.

8. The method of claim 1, wherein the slurry further comprises one or more additional ingredients selected from the group consisting of a nonfat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral.

9. The method of claim 1, wherein the slurry further comprises one or more additional ingredients selected from the group consisting of procream, whey cream, a dairy sold, a foodstuff, vegetable oil, and a food product.

10. The method of claim 4, wherein the slurry is heated to about 90° F. to about 293° F.

11. The method of claim 10, wherein the slurry is heated by injecting steam directly into the slurry.

12. The method of claim 10, wherein the slurry is heated by an indirect heat source.

13. The method of claim 1, further comprising adding one or more dry ingredients to the slurry, the cheese mass, or the admixture, whereby the admixture comprises the slurry, the cheese mass and the one or more dry ingredients.

14. The method of claim 1, wherein during mixing the slurry and heated soft or firm/semi-hard cheese mass are combined in a ratio of about 95:5 to about 5:95.

15. A method for making a soft or firm/semi-hard ripened or unripened blended cheese, comprising:

(a) adding a dry salt to a heated and homogenous mass of soft or firm/semi-hard cheese;

(b) combining a heated analog cheese slurry with the heated soft or firm/semi-hard cheese mass to form an admixture, wherein the slurry comprises a protein source, an oil or fat, water, and a sequestrant; and (c) shaping and cooling the admixture to form the soft or firm/semi-hard ripened or unripened blended cheese.

16. The method of claim 15, wherein the heated slurry further comprises one or more ingredients selected from the group consisting of a nonfat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a gum, a cellulose, a thickener, an oil, a fat, a cheese powder, a salt, a nutritional supplement, an acid, an enzyme, a neutraceutical, a carbohydrate, a vitamin, and a mineral.

17. The method of claim 15, wherein the heated slurry further comprises one or more ingredients selected from the group consisting of procream, whey cream, a dairy solid, vegetable oil, a foodstuff, and a food product.

18. The method of claim 15, wherein the concentration of the starch, the dairy solid, the gum and the cellulose in the slurry is sufficient such that the soft or firm/semi-hard ripened or unripened blended cheese that is produced has one or more of the following characteristics (i) a starch concentration of at least 0.5 wt %, (ii) a dairy solid concentration of at least 0.5 wt %, or (iii) an oil concentration of at least 5-35 wt. %.

19. A method for preparing a heated slurry for use in the preparation of a soft or firm/semi-hard ripened or unripened blended cheese, the method comprising:

a) blending a plurality of analog cheese ingredients together to form a slurry, the plurality of analog cheese ingredients, comprising an oil or fat that is liquid at room temperature;

b) heating the slurry to a temperature of about 90° F. to about 293° F.; and c) processing the slurry by performing one or more processes selected from the group consisting of subjecting the slurry to high shear conditions, homogenizing the slurry and adjusting the water content of the slurry to about 35-65 wt. %.

20. The method of claim 19, wherein blending comprises blending one or more additional ingredients with the analog cheese ingredients, the additional ingredients selected from the group consisting of a nonfat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral.

21. The method of claim 19, wherein the heated slurry further comprises one or more ingredients selected from the group consisting of procream, whey cream, a dairy solid, vegetable oil, a foodstuff, and a food product.

22. The method of claim 19, wherein the cheese has a starch concentration of about 0.5-26 wt %, and wherein the starch is added to the cheese by both a slurry, and as a dry powder.

23. The method of claim 15, wherein the method further comprises adding a dry powder ingredient to the homogenous mass of soft or firm/semi-hard cheese before combining the cheese with the slurry.

* * * * *